(12) United States Patent
Chien et al.

(10) Patent No.: US 8,934,552 B2
(45) Date of Patent: Jan. 13, 2015

(54) COMBINED REFERENCE PICTURE LIST CONSTRUCTION AND MAPPING

(75) Inventors: Wei-Jung Chien, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 13/361,634

(22) Filed: Jan. 30, 2012

(65) Prior Publication Data

US 2012/0250773 A1 Oct. 4, 2012

Related U.S. Application Data

(60) Provisional application No. 61/470,421, filed on Mar. 31, 2011, provisional application No. 61/503,481, filed on Jun. 30, 2011.

(51) Int. Cl.
*H04N 7/12* (2006.01)
*H04N 11/04* (2006.01)
*H04N 11/02* (2006.01)
*H04N 19/70* (2014.01)
*H04N 19/44* (2014.01)
*H04N 19/00* (2014.01)

(52) U.S. Cl.
CPC ... *H04N 19/00884* (2013.01); *H04N 19/00533* (2013.01); *H04N 7/26335* (2013.01)
USPC .................................. 375/240.26; 375/E7.2

(58) Field of Classification Search
CPC . H04N 7/50; H04N 7/26941; H04N 21/2365; H04N 21/4347; H04N 7/26244
See application file for complete search history.

(56) References Cited

U.S. PATENT DOCUMENTS 7,400,681 B2   7/2008 Joch et al.
7,835,451 B2   11/2010 Soh et al.
(Continued)

FOREIGN PATENT DOCUMENTS

WO   WO2010126612 A2   11/2010

OTHER PUBLICATIONS

Bross, et al., "WD4: Working Draft 4 of High-Efficiency Video Coding," JCTVC-F803_d2, (JCT-VS) of ITU-T SG16 WP3 and ISO/IEC JTC1/SC29/WG11 Joint Collaborative Team on Video Coding, 6th Meeting, Torino, IT, Jul. 14-22. 2011, 226 pp.
(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

The example techniques of this disclosure are directed to default construction techniques for the construction of a combined reference picture list, and default mapping techniques for the combined reference picture list. In some examples, a video coder may construct first and second reference picture lists from frame number values, and construct the combined reference picture list from the frame number values of the first and second reference picture lists. In some examples, a video coder may construct first and second reference picture lists from picture order count (POC) values, and construct the combined reference picture list from the POC values of the first and second reference picture lists. In some examples, a video coder may construct a combined reference picture list from received information for the construction, and map the pictures of the combined reference picture list to one of a first or second reference picture list.

30 Claims, 8 Drawing Sheets

(56) References Cited

U.S. PATENT DOCUMENTS

| | | | |
|---|---|---|---|
| 7,852,916 | B2 | 12/2010 | Duvivier |
| 8,520,961 | B2 | 8/2013 | Choi et al. |
| 2005/0185713 | A1 | 8/2005 | Winger et al. |
| 2008/0101474 | A1 | 5/2008 | Chiu et al. |
| 2009/0034618 | A1* | 2/2009 | Fu et al. .................. 375/240.16 |
| 2009/0067505 | A1 | 3/2009 | Tourapis et al. |
| 2009/0116558 | A1 | 5/2009 | Chen et al. |
| 2009/0238269 | A1 | 9/2009 | Pandit et al. |
| 2010/0008415 | A1 | 1/2010 | Kajita |
| 2010/0020871 | A1 | 1/2010 | Hannuksela et al. |
| 2010/0080301 | A1 | 4/2010 | Chujoh et al. |
| 2010/0104014 | A1 | 4/2010 | Koo et al. |
| 2010/0158120 | A1 | 6/2010 | Fang et al. |
| 2010/0208828 | A1 | 8/2010 | Lu et al. |
| 2011/0007803 | A1 | 1/2011 | Karczewicz et al. |
| 2011/0013889 | A1 | 1/2011 | Wu et al. |
| 2012/0250765 | A1 | 10/2012 | Wu et al. |
| 2013/0235933 | A1 | 9/2013 | Sasai et al. |

OTHER PUBLICATIONS

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.
Chen et al., "Comments on Generalized P and B Pictures," JCTVC-D401, 4th Meeting: Daegu, KR, Jan. 20-28, 2011, 4 pp.
Hsu et al., "Unified Syntax of Reference Picture List Recording," JCTVC-E053, 5th Meeting: Geneva, CH, Mar. 16-23, 2011, 4 pp.
International Search Report and Written Opinion—PCT/US2012/030153—ISA/EPO—Jun. 5, 2012, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Ohm et al., "Meeting report of the fourth meeting of the Joint Collaborative Team on Video Coding (JCT-VC), Daegu, KR, Jan. 20-28, 2011," 4th Meeting: Daegu, KR, Jan. 20-28, 2011, 113 pp.
Leontaris et al., "Weighted prediction methods for improved motion compensation," Image Processing (ICIP), 2009 16th IEEE International Conference on, IEEE, Piscataway, NJ, USA, Nov. 7, 2009, pp. 1029-1032, 4 pp.
Suzuki Y. et al., "Extension of uni-prediction simplification in B slices", 4. JCT-VC Meeting; 95. MPEG Meeting; Jan. 20-28, 2011; Daegu; (Joint Collaborative Team on Video Coding of ISO/IEC JTC1/SC29/WG11and ITU-T SG.16); URL: HTTP://WFTP3.ITU.INT/AV-ARCH/JCTVC-SITE/, No. JCTVC-D421, Jan. 20, 2011, p. 1-p. 3, 7 pp.
Sukuki(Qualcomm) Y et al: "Extension of uni-prediction simplification in B slices",4, JCT-VC Meeting, 95. MPEG Meeting, Jan. 20-28, 2011; Daegu; (Joint Collaborative Team on Video Coding of ISO/IEC JTCI/SC29/WGl/and ITU-T SG.16), URL: HTTP://WFTP3.ITU.INT/AV-ARCH/JCTVC-SITE/, No. JCTVC-D421_v3, Jan. 25, 2011, 8 pp.
Wang Y.K., et al: "On reference picture list construction for uni-predicted partitions", 5. JCT-VC Meeting; 96. MPEG Meeting; Mar. 16-23, 2011; Geneva; (Joint Collaborative Team on Video Coding of ISO /IEC JTC1/SC29/WG11and ITU-T SG. 16); URL: HTTP://WFTP3.ITU.INT/AV-ARCH/JC TVC-SITE/,, No. JCTVC-E348, Mar. 11, 2011, XP030008854, ISSN: 0000-0005, 6 pp.
Wiegand, T., et al., "WD2: Working Draft 2 of High Efficiency Video Coding", Jan. 28, 2011, No. JCTVC-D503, Jan. 28, 2011, XP002679642, Retrieved from the Internet: URL: http://wftp3.itu.int/av-arch/jctvc-site2011_01_D_Daegu/ [retrieved on Jul. 11, 2011], 153 pp.
Wiegand, T., et al., "WD3: Working Draft 3 of High-Efficiency Video Coding," Document JCTVC-E603, 5th Meeting: Geneva, CH, Mar. 16-23, 2011, 193 pp.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.
International Preliminary Report on Patentability from international application No. PCT/US2012/030153, dated Oct. 10, 2013, 9 pp.
Chien et al., "Modified Uni-directional Inter Prediction in Generalized P and B Picture," Document JCTVC-C285, WG11 No. m18328, 3rd Meeting: Guangzhou, CN, Oct. 7-15, 2010, 2 pp.
Co-pending U.S. Appl. No. 13/274,196, filed Oct. 14, 2011.
Flierl et al., "Generalized B Pictures and the Draft H.264/AVC Video-Compresiion Standard", IEEE Trans. Circuit and Systems for Video Technology, vol. 13, No. 7, pp. 587-597, 2003.
Pan, et al., "Fast Algorithms for Inter-view Prediction of Multiview Video Coding", School of Electronic Information Engineering, Tianjin University, Tianjin, China, Journal of Multimedia, vol. 6, No. 2, Apr. 2011, pp. 191-201.
Shen, et al., "Buffer Requirement Analysis and Reference Picture Marking for Temporal Scalable Video Coding", University of Science and Technology of China and Nokia Research Center, Finland, This paper appears in: Packet Video 2007, Lausanne, Switzerland, Nov. 12-13, 2007, pp. 91-97.

* cited by examiner

COMBINED REFERENCE PICTURE LIST CONSTRUCTION AND MAPPING

This application claims the benefit of U.S. Provisional Application No. 61/470,421, filed Mar. 31, 2011, and U.S. Provisional Application No. 61/503,481, filed Jun. 30, 2011; the contents of each are hereby incorporated by reference in their respective entirety.

TECHNICAL FIELD

This disclosure relates to video coding and decoding and, more particularly, to reference picture lists for video coding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks or coding units (CUs). Video blocks in an intra-coded (I) frame or slice are encoded using spatial prediction with respect to neighboring blocks in the same frame or slice. Video blocks in an inter-coded (P or B) frame or slice may use spatial prediction with respect to neighboring blocks in the same frame or slice or temporal prediction with respect to other reference pictures. Video blocks in a bidirectional predicted (B) frame may be encoded using bidirectional prediction to calculate two motion vectors from reference pictures in two different reference picture lists, such as one past frame and one future frame in terms of display order. Video blocks in a unidirectional predicted (P) frame may be encoded using unidirectional prediction to calculate a single motion vector from a reference picture in a single reference picture list, such as a past frame.

SUMMARY

In general, this disclosure describes techniques for a video coder to construct a combined reference picture list (List C or LC) from reference pictures in a first reference picture list (List 0 or L0) and a second reference picture list (List 1 or L1). The use of a combined reference picture list may simplify signaling of inter-prediction modes.

In one example, the video coder may utilize frame number values of pictures in reference picture List 0 and List 1 to produce the combined reference picture list (List C). In another example, the video coder may utilize picture order count (POC) values of pictures in reference picture List 0 and List 1 to produce the combined reference picture list. In either example, the video coder may receive the POC values or frame number values of the pictures in reference picture List 0 and List 1 in a coded bitstream.

In another example, the video coder may receive syntax elements for a combined reference picture list (List C), List 0, and List 1. The video coder may map the pictures of the combined reference picture list to reference pictures in one of List 0 or List 1, including any duplicate pictures present in both List 0 and List 1, while avoiding duplicate entries in List C.

In one example, this disclosure describes a method of coding video data, the method includes constructing a first reference picture list based on picture order count (POC) values of one or more reference pictures indicated to be in first reference picture list, and constructing a second reference picture list based on POC values of one or more reference pictures indicated to be in the second reference picture list.

In one example, this disclosure describes a video coding device that includes a memory operable to store reference pictures and a video coder. The video coder is operable to construct a first reference picture list based on POC values of one or more of the stored reference pictures indicated to be in the first reference picture list, and construct a second reference picture list based on POC values of one or more of the stored reference pictures indicated to be in the second reference picture list.

In one example, this disclosure describes a non-transitory computer-readable storage medium comprising instructions that, when executed, cause a video coder to construct a first reference picture list based on picture order count (POC) values of one or more reference pictures indicated to be in first reference picture list, and construct a second reference picture list based on POC values of one or more reference pictures indicated to be in the second reference picture list.

In one example, this disclosure describes a video coding device that includes means for constructing a first reference picture list based on picture order count (POC) values of one or more reference pictures indicated to be in first reference picture list, and means for constructing a second reference picture list based on POC values of one or more reference pictures indicated to be in the second reference picture list.

In one example, this disclosure describes a method of coding video data. The method includes signaling picture order count (POC) values for reference pictures of a first reference picture list for construction of the first reference picture list, and signaling POC values for reference pictures of a second reference picture list for construction of the second reference picture list.

In one example, this disclosure describes a video coding device that includes a memory operable to store reference pictures and a video coder. The video coder is operable to signal picture order count (POC) values for one or more of the stored reference pictures of a first reference picture list for construction of the first reference picture list, and signal POC values for one or more of the stored reference pictures of a second reference picture list for construction of the second reference picture list.

In one example, this disclosure describes a non-transitory computer-readable storage medium comprising instructions that, when executed, cause a video coder to signal picture order count (POC) values for reference pictures of a first reference picture list for construction of the first reference picture list, and signal POC values for reference pictures of a second reference picture list for construction of the second reference picture list.

In one example, this disclosure describes a video coding device that includes means for signaling picture order count (POC) values for reference pictures of a first reference picture list for construction of the first reference picture list, and means for signaling POC values for reference pictures of a second reference picture list for construction of the second reference picture list.

In one example, this disclosure describes a method of coding video data, the method includes constructing a first reference picture list based on frame number values of one or more reference pictures indicated to be in the first reference picture list, and constructing a second reference picture list based on frame number values of one or more reference pictures indicated to be in the second reference picture list. The method also includes constructing a combined reference picture list, without decoding instructions from an encoder that instruct a manner in which to construct the combined reference picture list, including one or more of the reference pictures from both the first reference picture list and the second reference picture list based on the frame number values of the reference pictures of the first reference picture list and the second reference picture list.

In one example, this disclosure describes a video coding device that includes a memory operable to store reference pictures and a video coder. The video coder is operable to construct a first reference picture list based on frame number values of one or more of the stored reference pictures indicated to be in the first reference picture list, and construct a second reference picture list based on frame number values of one or more of the stored reference pictures indicated to be in the second reference picture list. The video coder is also operable to construct a combined reference picture list, without decoding instructions from an encoder that instruct a manner in which to construct the combined reference picture, including one or more of the reference pictures from both the first reference picture list and the second reference picture list based on the frame number values of the reference pictures of the first reference picture list and the second reference picture list.

In one example, this disclosure describes a non-transitory computer-readable storage medium comprising instructions that, when executed, cause a video coder to construct a first reference picture list based on frame number values of one or more reference pictures indicated to be in the first reference picture list, and construct a second reference picture list based on frame number values of one or more reference pictures indicated to be in the second reference picture list. The instructions, when executed, also cause the video coder to construct a combined reference picture list, without decoding instructions from an encoder that instruct a manner in which to construct the combined reference picture list, including one or more of the reference pictures from both the first reference picture list and the second reference picture list based on the frame number values of the reference pictures of the first reference picture list and the second reference picture list.

In one example, this disclosure describes a video coding device that includes means for constructing a first reference picture list based on frame number values of one or more reference pictures indicated to be in the first reference picture list, and means for constructing a second reference picture list based on frame number values of one or more reference pictures indicated to be in the second reference picture list. The video coding device also includes means for constructing a combined reference picture list, without decoding instructions from an encoder that instruct a manner in which to construct the combined reference picture list, including one or more of the reference pictures from both the first reference picture list and the second reference picture list based on the frame number values of the reference pictures of the first reference picture list and the second reference picture list.

In one example, this disclosure describes a method of coding video data. The method includes constructing a first reference picture list and a second reference picture list, and constructing a combined reference picture list. In this method, the combined reference picture list includes one or more reference pictures that are mapped to corresponding reference pictures in the first reference picture list and the second reference picture list. Also, in this method, if one of the reference pictures in the combined reference picture list corresponds to reference pictures in both of the first reference picture list and the second reference picture list, the method includes mapping that reference picture in the combined reference picture list to only one of the corresponding reference pictures in only one of the first and second reference picture lists.

In one example, this disclosure describes a video coding device that includes a memory operable to store reference pictures and a video coder. The video coder is operable to construct a first reference picture list and a second reference picture list, and construct a combined reference picture list, wherein the combined reference picture list includes one or more reference pictures that are mapped to corresponding reference pictures in the first reference picture list and the second reference picture list. In this example, if one of the reference pictures in the combined reference picture list corresponds to reference pictures in both of the first reference picture list and the second reference picture list, the video coder is operable to map that reference picture in the combined reference picture list to only one of the corresponding reference pictures in only one of the first and second reference picture lists.

In one example, this disclosure describes a non-transitory computer-readable storage medium comprising instructions that, when executed, cause a video coder to construct a first reference picture list and a second reference picture list, and construct a combined reference picture list. In this example, the combined reference picture list includes one or more reference pictures that are mapped to corresponding reference pictures in the first reference picture list and the second reference picture list. Also, in this example, if one of the reference pictures in the combined reference picture list corresponds to reference pictures in both of the first reference picture list and the second reference picture list, the instructions, when executed, cause the video coder to map the reference picture in the combined reference picture list to only one of the corresponding reference pictures in only one of the first and second reference picture lists.

In one example, this disclosure describes a video coding device that includes means for constructing a first reference picture list and a second reference picture list, and means for constructing a combined reference picture list. In this example, the combined reference picture list includes one or more reference pictures that are mapped to corresponding reference pictures in the first reference picture list and the second reference picture list. Also, in this example, if one of the reference pictures in the combined reference picture list corresponds to reference pictures in both of the first reference picture list and the second reference picture list, the video coding device includes means for mapping that reference picture in the combined reference picture list to only one of the corresponding reference pictures in only one of the first and second reference picture lists.

The details of one or more examples are set forth in the accompanying drawings and the description below. Other features, objects, and advantages will be apparent from the description and drawings, and from the claims.

DETAILED DESCRIPTION

Figure 1:
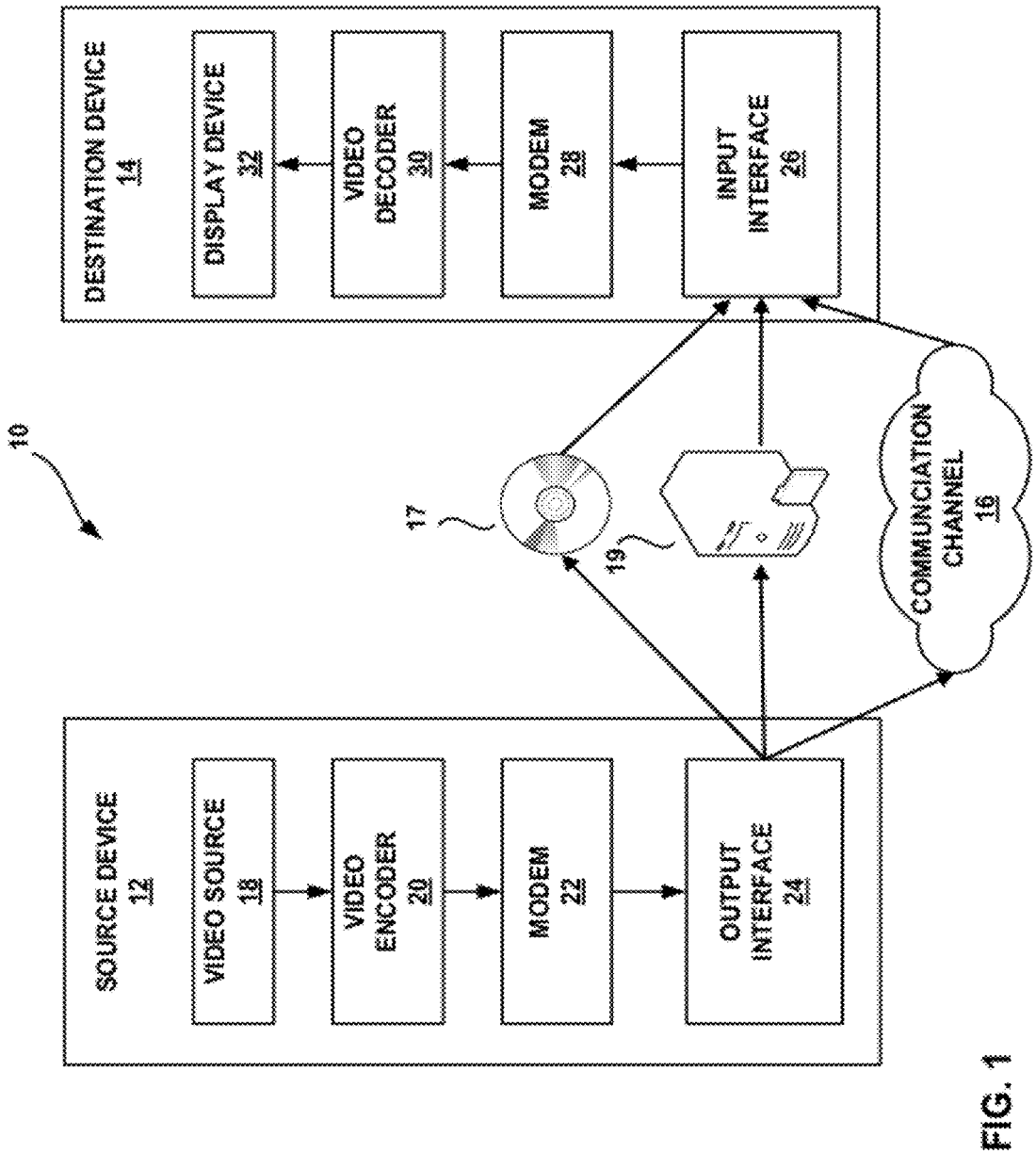
FIG. 1 is a block diagram illustrating an example video encoding and decoding system.

In general, in some examples, this disclosure describes techniques for a video coder to construct a combined reference picture list (List C or LC) from reference picture lists (List or L0 and List 1 or L1) that indicate reference pictures that were utilized to encode a video block, such as a prediction unit as one example. In some other examples, this disclosure also describes techniques to map reference pictures of the combined reference picture list to one of the reference picture lists to construct the combined reference picture list. For example, each picture in the combined reference picture lists maps to one picture in List 0 or List 1. The techniques of this disclosure may be used, for example, in conjunction with video coding processes defined according to the High Efficiency Video Coding (HEVC) standard currently under development by the ITU-T/ISO/IEC Joint Collaborative Team on Video Coding (JCT-VC), or other video coding processes.

Digital video coding devices implement video compression techniques to transmit and receive digital video information more efficiently. Video compression may involve spatial (intra-frame) prediction and/or temporal (inter-frame) prediction to reduce or remove redundancy inherent in video sequences.

For video coding according to the HEVC standard, a slice of a video frame may be partitioned into coding units. Each coding unit may be further partitioned into prediction units. Some prediction units may be intra-coded (I) using spatial prediction with respect to neighboring reference blocks in the same frame. Other prediction units may be inter-coded (P or B) with respect to reference blocks in other frames. The other frames used for inter-coding may be referred to as reference frames or reference pictures.

In this disclosure, the terms "frame" and "picture" may be used interchangeably. The HEVC standard currently under development utilizes the term picture to refer to portions of the video that are conventionally referred to as frames. Because the term frame has a well established meaning in video coding, to assist with understanding, this disclosure utilizes the terms frames and pictures interchangeably Video encoders store lists of reference frames in memory for use during inter-frame coding. In some examples, there may be two lists of reference frames, e.g., List 0 and List 1. The reference frames, e.g., pictures, in these lists may indicate which pictures the encoder used to encode a current video block. For instance, List 0 may indicate which reference frames the encoder used to encode a video block, and List 1 may similarly indicate which reference frames the encoder used to encode that video block. As one non-limiting example used for illustration purposes, and should not be considered limiting, the list of reference frames used for encoding with display times before the currently coded frame may be in List 0, and the list of reference frames used for encoding with display times after the currently coded frame may be referred to as List 1. However, it should be understood that the encoder need not follow this example in all instances. For example, for generalized P or B (GPB) frames, the reference frames identified in List 0 may be displayed before or after the current frame, and similarly, the reference frames identified in List 1 may be displayed before or after the current frame. The encoder may choose which frames are in List 0 and which frames are in List 1 based on any criteria, and not necessarily display order.

A P-coded video block is inter-coded using a motion vector in a forward direction relative to a reference block in a reference frame from reference picture List 0. A B-coded video block may be inter-coded using (a) a motion vector relative to a reference block in a reference frame from reference picture List 0, (b) a motion vector relative to a reference block in a reference frame from reference picture List 1, or (c) two motion vectors relative to reference blocks in frames from List 0 and List 1, respectively.

According to the current test model under consideration (TMuC) of the HEVC standard, video blocks in a frame or slice may be inter-coded using a generalized P and B (GPB) coding mode instead of P or B modes. When enabled, the GPB mode permits the reference picture List 0 and reference picture List 1 to be identical for a B frame. Hence, the GPB mode, as proposed for the HEVC standard, generally refers to inter-frame predictive coding using identical reference picture lists (List 0 and List 1).

In the proposed HEVC standard, syntax elements defined to indicate reference frame list information are encoded and signaled to a decoding device, e.g., a decoder, in a slice header. Upon receipt of the coded video frame and its associated syntax elements, the decoder performs reference frame list construction for List 0 and List 1 based on the syntax elements.

For a B picture, in each prediction unit, an encoder normally sends a syntax element inter_pred_idc to specify whether bi-directional (Bi), unidirectional prediction from List 0 (Pred_L0) or unidirectional prediction (Pred_L1) from List 1 is used for a currently coded prediction unit. For a B picture, the inter_pred_idc syntax element consumes two bits to indicate one of the three statuses: Bi, Pred_L0, or Pred_L1. Bi refers to bidirectional prediction using motion vectors from List 0 and List 1, Pred_L0 refers to unidirectional prediction using a motion vector from List 0, and Pred_L1 refers to unidirectional prediction using a motion vector from List 1.

JCT-VC C285, "Modified uni-directional inter prediction in generalized P and B pictures," Wei-Jung Chien et al., October 2010, proposes modification of the signaling of the inter_pred_idc element based on whether a B slice is a GPB slice or not. When the picture is a GPB slice, because the reference picture List 0 and List 1 are identical, there are only two possible statuses for a prediction unit in the slice: Pred_L0 and Bi. Hence, signaling three statuses using the inter_pred_idc syntax element is inefficient. Instead, it is possible to modify the inter_pred_idc syntax element based on whether a B slice is a normal B slice requiring indication of one of three statuses or a GPB slice requiring indication of only two statuses: Pred_L0 and Bi. Signaling only two statuses for a B slice may provide significant gains in signaling efficiency.

Some of the concepts of a GPB mode may be further generalized to apply to cases in which the two reference frame lists (List 0 and List 1) are not necessarily identical, but are combined into a so-called combined reference picture list. In this case, as in the GPB mode, it is not necessary to signal three statuses of the prediction structure with the inter_pred_idc syntax element. Rather, as in the GPB case, when a combined reference picture list is constructed for prediction, it is only necessary to signal two statuses: Pred_LC and Bi. The example techniques described herein may provide for techniques to construct such a combined reference picture list such that encoder may be able to signal either the Pred_LC or Bi status for a video block of B-frame or slice rather than the Pred_L0, Pred_L1, or Bi status for such a video block.

As described above, the decoder receives the coded video frames and its associated syntax elements, and constructs List 0 and List 1 from the associated syntax elements. The decoder may then utilize various techniques to construct a combined reference picture list (List C) based on the reference frames in List 0 and List 1. These techniques may include an initialization step and, in some instances, a reordering step to construct List 0 and List 1. For a video frame coded as a GPB frame, the construction of both List 0 and List 1 may not be necessary because both lists are identical. In these situations, the decoder constructs one list, and copies the constructed list to generate both List 0 and List 1. In any event, at the conclusion of the reconstruction, for a B frame in GPB mode or otherwise, the decoder may have constructed a List 0 and a List 1.

In accordance with the techniques of this disclosure, the List 0 and List 1 constructed by the decoder may include frame number values for each of the reference frames used to encode a video block (e.g., a prediction unit), or include picture order count (POC) values for each of the reference frames used to encode a video block. Each frame number value refers to one encoded frame and represents the order in which the reference frames are to be decoded. For example, the reference frame with the lowest frame number value is decoded before any other reference frame. The reference frame with the next lowest frame number value is decoded after the reference frame with the lowest frame number value, and before any other reference frame, and so forth. However, the frame number values need not necessarily represent the order in which the frames are to be displayed. For instance, the encoded frame with frame number value of three need not necessarily be the fourth displayed frame. Instead, it is possible that the frame with a frame number value of one will be encoded second, but displayed later than second in presentation order.

Each POC value refers to one encoded frame and represents the order in which the encoded frames are to be displayed. For example, the reference frame with the lowest POC value is displayed before any other reference frame. The reference frame with the next lowest POC value is displayed after the reference frame with the lowest POC value, and before any other reference frame, and so forth. The POC values need not necessarily represent the order in which the decoder decodes the frames. For instance, the first frame decoded by the decoder need not necessarily be the frame with a POC value of zero.

There may be no inter_pred_idc syntax element for P frames because the inter_pred_idc syntax element may be reserved for B frames. For example, video blocks of P frames are predicted only from one reference frame, and generally a temporally prior reference frame in display order identified in only List 0. Because only a reference frame identified in the List 0 may be necessary to predict a video block of a P frame, all of the statuses represented by the inter_pred_idc syntax element may not be needed for a P frame.

When the inter_pred_idc syntax element indicates the Bi status for a video block of a B frame, the decoder decodes the video block utilizing the reference frames listed in the constructed List 1 and List 0. When the inter_pred_idc syntax element indicates the Pred_LC status for a video block of a B frame, the decoder decodes the video block utilizing the reference pictures listed in a combined reference picture list (List C or LC). However, in some examples, while the decoder may receive syntax elements that allow it to construct List 0 and List 1, the decoder may not receive syntax elements that allow it to construct the combined reference picture list. Instead, the decoder may be configured to construct the combined List C from the constructed List 0 and List 1. In other words, in some examples, the decoder receives syntax elements to construct List 0 and List 1, and does not receive syntax elements to construct the combined reference picture List C. Accordingly, in some examples, the decoder may be tasked with constructing the combined reference picture list from List 0 and List 1. To construct List C, the decoder may be configured to use frame number values or POC values for the reference frames in List 0 and List 1.

In other examples, as described in more detail, the decoder may receive syntax elements, from the encoder, for the combined reference picture List C, List 0 and List 1. The decoder may then construct the combined reference picture list from the received syntax of the combined reference picture list, rather than from List 0 and List 1. In these examples, the decoder may map the reference pictures of the combined reference picture List C to one of List 0 or List 1, and in case of duplicates (i.e., reference frames that appear in both List 0 and List 1), to only one of List 0 or List 1. The term "map" or "mapping" refers to an implicit or explicit indication that indicates whether a reference picture in the combined reference picture list came from List 0 or List 1.

The mapping may assist the decoder in properly decoding the frames. For example, to decode a video block of a frame, the decoder may need to know whether a reference picture needed to decode the frame is from List 0 or List 1 so that the decoder can properly resolve motion vectors used to point to a block in the reference picture. With the mapping, the decoder may be able to resolve the motion vectors, which may allow the decoder to properly decode subsequent frames. Without the mapping, the decoder may not be able to resolve the motion vectors, and in this situation, the decoder may properly decode a current frame, but may not be able to correctly decode frames subsequent to the current frame.

In the previous examples, e.g., where the decoder did not receive syntax elements for construction of the combined reference picture list, because the decoder constructs the combined reference picture list from List 0 and List 1, the decoder may be knowledgeable about the mapping between the combined reference picture list and List 0 and List 1. However, in these examples, where the decoder received the syntax elements for the combined reference picture list, List 0, and List 1, the decoder may not be knowledgeable about the mapping between the reference pictures of the combined reference picture list and List 0 and List 1. This may be because the decoder constructed the combined reference picture list from the syntax elements of the combined reference picture list, and not from List 0 and List 1.

As described in more detail, for a duplicate reference picture that exists in both List 0 and List 1, the decoder may select the reference picture in one of List 0 or List 1, and map that duplicate reference picture in combined reference picture list to the selected one of List 0 or List 1, thereby avoiding duplication of mapping of the reference pictures in the combined reference picture List C. For a non-duplicate reference picture, the decoder may map the non-duplicate reference picture in the combined reference list to the one of List 0 or List 1 that includes that non-duplicate reference picture. In this manner, the decoder may be knowledgeable of the mapping between the reference pictures of the combined reference picture and List 0 and List 1.

Some of the example techniques described in this disclosure describe default construction techniques for a decoder to construct the combined reference picture list. The term "default construction" means that the decoder need not receive explicit instructions from the encoder that indicate how the decoder should construct the combined reference picture list (List C). Instead, the decoder may be configured to apply a predefined process to construct List C based on reference pictures in List 0 and List 1. List 0 and List 1 may be constructed by the decoder according to explicit instructions specified by the encoder in the encoded bitstream, or by other default construction techniques. However, the decoder may then use List 0 and List 1, however constructed, to construct List C according to the predefined default construction process.

In this manner, the example techniques described below may further reduce the amount of information that the decoder needs to receive, e.g., the decoder need not receive instructions for how to construct the combined reference picture list, which may promote efficient bandwidth usage. The term "default construction" is applicable to the examples where the decoder receives syntax elements for construction of List 0 and List 1 in the encoded bitstream, but does not receive syntax elements for the combined reference picture List C.

Some of the other example techniques described in this disclosure describe default mapping techniques for a decoder to map the reference pictures of the combined reference picture List C to List 0 or List 1. For reference pictures of the combined reference picture list that are in both List 0 and List 1, the decoder may map such reference pictures to one of List 0 or List 1, but not both. The term "default mapping" means that the decoder receives syntax elements for the reference pictures in the combined reference picture list, and maps the reference pictures in the combined reference picture list to one of List 0 or List 1. In the "default mapping" techniques, the decoder need not receive explicit instructions that indicate to which one of List 0 or List 1 the decoder should map the reference pictures of the combined reference picture list.

FIG. 1 is a block diagram illustrating an example video encoding and decoding system 10 that may utilize default construction techniques for constructing a combined reference picture list from constructed reference picture lists, e.g., List 0 and List 1, or default mapping techniques for mapping the combined reference picture list to one of List 0 or List 1. In general, a reference picture list may be alternatively referred to as a reference frame list. As shown in FIG. 1, system 10 includes a source device 12 that generates encoded video for decoding by destination device 14. Source device 12 and destination device 14 may each be an example of a video coding device. Source device 12 may transmit the encoded video to destination device 14 via communication channel 16 or may store the encoded video on a storage medium 17 or a file server 19, such that the encoded video may be accessed by the destination device 14 as desired.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, the file server 19 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

The techniques of this disclosure, however, which concern efficient construction or mapping of a combined reference picture list, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony In the example of FIG. 1, source device 12 includes a video source 18, video encoder 20, a modulator/demodulator (MODEM) 22 and an output interface 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via output interface 24. Modem 22 may include various mixers, filters, amplifiers or other components designed for signal modulation. Output interface 24 may include circuits designed for transmitting data, including amplifiers, filters, and one or more antennas.

The captured, pre-captured, or computer-generated video that is encoded by the video encoder 20 may also be stored onto a storage medium 17 or a file server 19 for later consumption. The storage medium 17 may include Blu-ray discs, DVDs, CD-ROMs, flash memory, or any other suitable digital storage media for storing encoded video. The encoded video stored on the storage medium 17 may then be accessed by destination device 14 for decoding and playback.

File server 19 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 19 may be a streaming transmission, a download transmission, or a combination of both. The file server 19 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes an input interface 26, a modem 28, a video decoder 30, and a display device 32. Input interface 26 of destination device 14 receives information over channel 16, as one example, or from storage medium 17 or file server 17, as alternate examples, and modem 28 demodulates the information to produce a demodulated bitstream for video decoder 30. The demodulated bitstream may include a variety of syntax information generated by video encoder 20 for use by video decoder 30 in decoding video data. Such syntax may also be included with the encoded video data stored on a storage medium 17 or a file server 19. As one example, the syntax may be embedded with the encoded video data, although aspects of this disclosure should not be considered limited to such a requirement. The syntax information defined by video encoder 20, which is also used by video decoder 30, may include syntax elements that describe characteristics and/or processing of video blocks, such as prediction units (PUs), coding units (CUs) or other units of coded video, e.g., video slices, video pictures, and video sequences or groups of pictures (GOPs). Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The HEVC standard is currently under development by the ITU-T/ISO/IEC Joint Collaborative Team on Video Coding (JCT-VC). The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. In some instances, video encoder 20 and video decoder 30 may be commonly referred to as a video coder that codes information (e.g., pictures and syntax elements). The coding of information may refer to encoding when the video coder corresponds to video encoder 20. The coding of information may refer to decoding when the video coder corresponds to video decoder 30.

Furthermore, the techniques described in this disclosure may refer to video encoder 20 signaling information. When video encoder 20 signals information, the techniques of this disclosure generally refer to any manner in which video encoder 20 provides the information. For example, when video encoder 20 signals syntax elements to video decoder 30, it may mean that video encoder 20 transmitted the syntax elements to video decoder 30 via output interface 24 and communication channel 16, or that video encoder 20 stored the syntax elements via output interface 24 on storage medium 17 and/or file server 19 for eventual reception by video decoder 30. In this way, signaling from video encoder 20 to video decoder 30 should not be interpreted as requiring transmission from video encoder 20 that is immediately received by video decoder 30, although this may be possible. Rather, signaling from video encoder 20 to video decoder 30 should be interpreted as any technique with which video encoder 20 provides information for eventual reception by video decoder 30.

Video encoder 20 of source device 12 may be configured to apply the techniques for reducing the amount of information that needs to be transmitted for destination device 14 to construct or map a combined reference picture list. The combined reference picture list may be a combination of two reference picture lists. For example, video encoder 20 may encode a video block of a frame with respect to reference pictures in a first reference picture list, referred to as List 0, and a second reference picture list, referred to as List 1. Video encoder 20 may also encode syntax elements that indicate the number of reference pictures in each one of List 0 and List 1 and construction commands for destination device 14 to construct List 0 and List 1. As described in further detail, with constructed List 0 and List 1, destination device 14 constructs a combined reference picture list (List C or LC) utilizing one or more default construction techniques.

In some alternate examples, video encoder 20 may encode syntax elements for the reference pictures in the combined reference picture list. Video encoder 20 may also transmit these syntax elements for the combined reference picture list or signal in the encoded bitstream these syntax elements for the combined reference picture list, in these alternate examples. Destination device 14 may construct the combined reference picture list from the syntax elements for the combined reference picture list. Destination device 14 may then map each one of the reference pictures of the combined reference picture list from one of List 0 or List 1, in these alternate examples.

The construction of the combined reference picture list may be needed for the decoding of certain types of inter-coded frames. For example, video encoder 20 may predict video blocks a frame with respect to other frames, referred to as reference frames or reference pictures. One example of predict video block is a video block of a P frame. A video block of a P frame is coded with respect to a reference block in a reference frame in List 0. Another example of a predicted video block is a video block of a B frame. A video block of a B frame may be coded with respect to (a) a reference block in a reference frame from List 0, (b) a reference block in a reference frame from List 1, or (c) two reference blocks in frames from both List 0 and List 1, respectively.

For purposes of brevity, examples (a) and (b) of the B frame may be referred to as unidirectional predicted video blocks of a B frame, and example (c) of the B frame may be referred to as bidirectional predicted video blocks of a B frame (or normal B frame). The construction of a combined reference picture list may be applicable for video blocks that are unidirectional predicted.

For example, in addition to the syntax elements described above, video encoder 20 may also transmit syntax elements that indicate whether a video block of a frame is unidirectional predicted or bidirectional predicted. This syntax element is referred to as the inter_pred_idc syntax element. In some techniques, video encoder 20 may consume two digital bits for the inter_pred_idc syntax element to indicate one of the three statuses of such video blocks, e.g., to indicate unidirectional from List 0, unidirectional from List 1, or bidirectional from both List 0 and List 1.

The ITU-T/ISO/IEC Joint Collaborative Team on Video Coding (JCT-VC), in the "Modified uni-directional inter prediction in generalized P and B pictures," Wei-Jung Chien et al., October 2010 has proposed techniques to reduce the size of the inter_pred_idc syntax element from two digital bits to a single digital bit for the High Efficiency Video Coding (HEVC) standard currently under development by the ITU-T/ISO/IEC JCT-VC. In accordance with the proposed techniques, video encoder 20 sets the value of the single digital bit of the inter_pred_idc syntax element based on the status of a video block, e.g., whether a video block is unidirectional predicted or bidirectional predicted, to reduce the amount of bits that need to be transmitted for such video blocks from two bits to one bit.

In these proposed techniques, a unidirectional predicted video block of a B frame is coded with respect a block of a reference frame in a combined reference picture list. The combined reference picture list is a particular combination of frames from List 0 and List 1. In this example, a first value of the single digital bit (e.g., a digital one or zero) of the inter_pred_idc syntax element, referred to as Bi, indicates that a bidirectional predicted video block is predicted with respect to a reference frame in List 0 and a reference frame in List 1. A second value of the single digital bit (e.g., the digital opposite of the first value) of the inter_pred_idc syntax element, referred to as Pred_LC, indicates that a unidirectional predicted video block is predicted with respect to a reference frame in the combined reference picture list. The inter_pred_idc syntax element may be signaled at the frame level, a slice level, or a video block level. When Pred_LC is signaled, the decoder may construct the combined reference picture List C. When Bi is signaled, in some examples, it is not necessary for the decoder to construct the combined reference picture List C.

For each video block of a B frame, video encoder 20 may transmit syntax elements and construction commands to destination device 14 to construct List 0 and List 1, e.g., in a normal manner. However, in accordance with the default construction techniques of this disclosure, when Pred_LC is signaled, video encoder 20 need not necessarily transmit syntax elements and construction commands to destination device 14 to construct the combined reference picture list, thereby reducing the amount of bits that video encoder 20 needs to transmit. For each video block of a B frame, video encoder 20 may also transmit the inter_pred_idc syntax element. If the value of the inter_pred_idc syntax element is Bi for a video block, then destination device 14 decodes the bidirectional predicted video block utilizing the reference frames of List 0 and List 1, which may be constructed in a normal manner.

If, however, the value of inter_pred_idc syntax element is Pred_LC for a video block, then decoder 30 of destination device 14 may need to construct the combined reference picture list from the constructed List 0 and List 1 for decoding such video blocks. In general, when the value of the inter_pred_idc syntax element for a video block is Bi, that video block may be bidirectional predicted from reference frames identified in List 0 and List 1. When the value of inter_pred_idc syntax element for a video block is Pred_LC, that video block may be unidirectional predicted from a reference frame identified in the combined reference picture list (List C or LC).

Because destination device 14 need not necessarily receive syntax elements and construction commands for the combined reference picture list, this disclosure describes example techniques for destination device 14 to implement default construction techniques to construct the combined reference picture list. The phrase default construction means that destination device 14 can construct the combined reference picture list without syntax elements for a combined reference picture list and instructions on how to construct the combined reference picture list (e.g., construction commands for the combined reference picture list). After construction of the combined reference picture list, destination device 14 can decode the unidirectional predicted video block utilizing the reference frames of the combined reference picture list.

It should be understood that there may be slight variations of the techniques described above, and the example techniques of this disclosure are still applicable to such variations. For example, video encoder 20 may be able to designate some frames as a generalized P/B (GPB) frame. For GPB frames, the List 0 and List 1 are identical. Therefore, rather than transmitting the syntax elements and construction commands for both List 0 and List 1, video encoder 20 transmits syntax elements and construction commands for a single list. In these situations, destination device 14 constructs only one list, and copies the constructed list to construct List 0 and List 1. However, in any event, destination device 14 constructs List 0 and List 1 for bidirectional predicted video blocks, albeit utilizing different techniques for GPB frames. Even for GPB frames, the example techniques described in this disclosure may utilize default construction techniques to construct the combined reference picture list from List 0 and List 1.

In accordance with some examples of this disclosure, video decoder 30 of destination device 14 may be configured to apply the example default construction techniques described herein. For example, video decoder 30 may construct List 0 and List 1 from the received syntax elements and the construction commands. Video decoder 30 may also determine the value of the inter_pred_idc syntax element. If the value of the inter_pred_idc syntax element is Bi for a predicted video block, video decoder 30 may decode that video block utilizing reference frames from List 0 and List 1. If the value of inter_pred_idc syntax element is Pred_LC for a predicted video block, video decoder 30 may implement one of the default construction techniques to construct the combined reference picture list (List C), which are described in more detail below. After constructing the combined reference picture list, video decoder 30 may decode the video block utilizing frames from the combined reference picture list.

In accordance with some other examples of this disclosure, video decoder 30 of destination device 14 may be configured to apply example default mapping techniques. For example, in the default mapping techniques, video decoder 30 may receive syntax elements for the reference pictures in the combined reference picture list, as well as syntax elements for List 0 and List 1. Video decoder 30 may then construct the combined reference picture list (List C or LC), List 0, and List 1 from their respective syntax elements. Video decoder 30 may then map reference pictures in the combined reference picture list to reference pictures of one of constructed List 0 or List 1. The term "map" or "mapping" means an implicit or explicit indication that indicates whether a reference picture of the combined reference picture list is from List 0 or List 1. In each case, the combined reference picture List C may be constructed by reference to the reference pictures already specified for inclusion in List 0 and List 1, which have been previously constructed by video decoder 30.

For purposes of illustration and to ease understanding, the default construction techniques are described first, followed by the default mapping techniques. It should be understood that in the default construction techniques, video decoder 30 may perform mapping between the pictures of the combined reference picture list and List 0 and List 1 during the construction of the combined reference picture list. This is because video decoder 30 constructs the combined reference picture list from List 0 and List 1. Therefore, in the default construction techniques, video decoder 30 is knowledgeable as to whether a reference picture of the combined reference picture list is from List 0 or List 1. For the default mapping techniques, because video decoder 30 constructs the combined reference picture list from the received syntax elements for the combined reference picture list, video decoder 30 may not be knowledgeable of the mapping between the reference pictures of the combined reference picture List C and List 0 and List 1. Therefore, in these instances, the default mapping techniques may be appropriate.

The JCT-VC is working on development of the HEVC standard, sometimes referred to as the future H.265 standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-three intra-prediction encoding modes.

The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

A CU that is not further split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU.

The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or a combined reference picture list) for the motion vector. Data for the CU defining the PU(s) may also describe, for example, partitioning of the CU into one or more PUs. Partitioning modes may differ between whether the CU is skip or direct mode encoded, intra-prediction mode encoded, or inter-prediction mode encoded.

A CU having one or more PUs may also include one or more transform units (TUs). Following prediction using a PU, a video encoder may calculate residual values for the portion of the CU corresponding to the PU. The residual values correspond to pixel difference values that may be transformed into transform coefficients quantized, and scanned to produce serialized transform coefficients for entropy coding. A TU is not necessarily limited to the size of a PU. Thus, TUs may be larger or smaller than corresponding PUs for the same CU. In some examples, the maximum size of a TU may be the size of the corresponding CU. This disclosure uses the term "video block" to refer to any of a CU, PU, or TU.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a coding unit (CU) or a prediction unit (PU) of the CU. The video blocks may have fixed or varying sizes, and may differ in size according to a specified coding standard. Each video frame may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding to produce a PU for a CU, video encoder 20 may calculate residual data to produce one or more transform units (TUs) for the CU. PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of the unencoded picture and prediction values of a PU of a CU. Video encoder 20 may form one or more TUs including the residual data for the CU. Video encoder 20 may then transform the TUs to produce transform coefficients.

Following any transforms to produce transform coefficients, quantization of transform coefficients may be performed. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

To perform CABAC, video encoder 20 may select a context model to apply to a certain context to encode symbols to be transmitted. The context may relate to, for example, whether neighboring values are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on the context assigned to the symbols.

Video encoder 20 may also entropy encode syntax elements indicating numbers of reference pictures and reference picture list construction commands to enable video decoder 30 to reconstruct the reference picture lists (e.g., List 0 and List 1) used to encode CUs of a video frame. Similarly, video encoder 20 may entropy encode other syntax elements as well such as the inter_pred_idc syntax element as part of its encoding. As described above, the inter_pred_idc syntax element may be a single bit value, rather than a two bit value. In this manner, video encoder 20 may reduce the number of bits it transmits for each prediction unit, which may provide significant transmission bandwidth gains. In general, video encoder 20 may encode all of the syntax elements that are transmitted to destination device 14.

In some aspects, video decoder 30 may operate in a manner essentially symmetrical to that of video encoder 20. For example, video decoder 30 may receive entropy encoded data representative of encoded CUs of a video frame. This received data may include syntax elements indicating a number of reference pictures and reference picture list construction commands for the reference picture lists List 0 and List 1. In accordance with this disclosure, video decoder 30 may also construct the combined reference picture list from the constructed List 0 and List 1. In some examples, video decoder 30 may construct the combined reference picture list without syntax elements or construction commands for the combined reference picture list. In this manner, video decoder 30 may be able to decode video blocks that have been encoded in a unidirectional predicted manner with respect to a combined reference picture list without necessarily receiving the syntax elements for the combined reference picture list.

Figure 2:
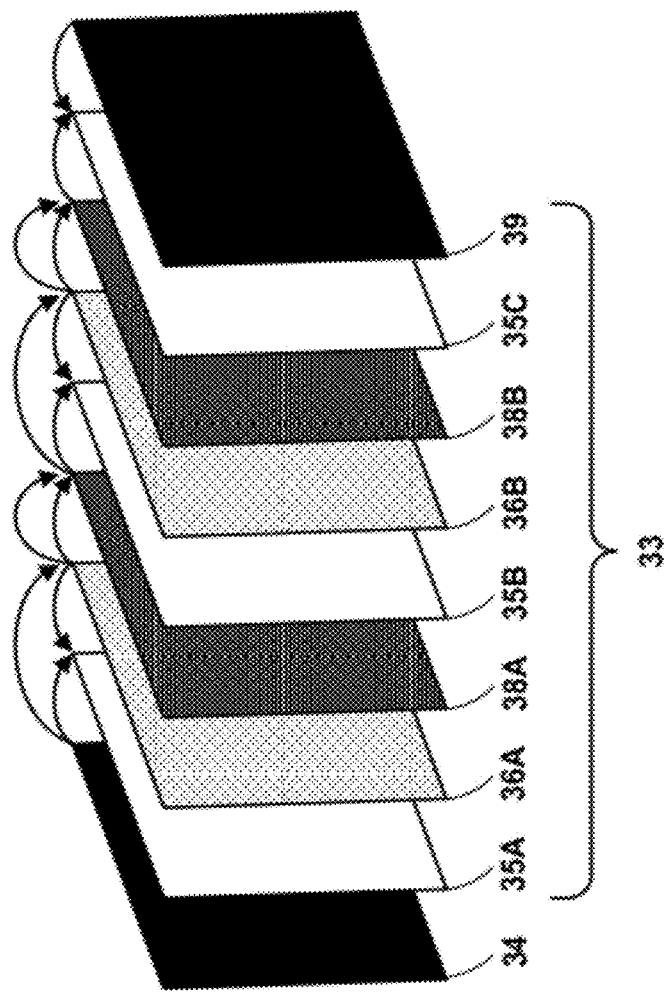
FIG. 2 is a conceptual diagram illustrating an example video sequence that includes a plurality of frames that are encoded and transmitted.

FIG. 2 is a conceptual diagram illustrating an example video sequence 33 that includes a plurality of frames that are encoded and transmitted. In some cases, video sequence 33 may be referred to as a group of pictures (GOP). Video sequence 33, as illustrated, includes frames 35A, 36A, 38A, 35B, 36B, 38B, and 35C, and final frame 39 in display order. Frame 34 is a final frame in display order for a sequence occurring before sequence 33. FIG. 2 generally represents an exemplary prediction structure for a video sequence and is intended only to illustrate the frame references used for predicting video blocks of different slice or frame types (e.g., P frame or slice, B frame or slice, or GPB frame or slice). An actual video sequence may contain more or fewer video frames of different frame types and in a different display order. Video sequence 33 may include more or fewer frames than those illustrated in FIG. 2, and the frames illustrated in video sequence 33 are illustrated for purposes of understanding and as examples.

For block-based video coding, each of the video frames included in sequence 33 may be partitioned into video blocks, such as coding units (CUs) or prediction units (PUs). For instance, each CU of a video frame may include one or more PUs. Video blocks in an intra-coded (I) frame are predicted using spatial prediction with respect to neighboring blocks in the same frame. Video blocks in an inter-coded (P, B, or GPB) frame may use spatial prediction with respect to neighboring blocks in the same frame or temporal prediction with respect to other reference pictures.

Video blocks in a B frame may be predicted using bidirectional prediction to calculate two motion vectors from two different reference picture lists, traditionally one past frame and one future frame (e.g., bidirectional B-coded). In some cases, video blocks in a B frame may be predicted using unidirectional prediction from one of the two different reference picture lists (e.g., unidirectional B-coded). Video blocks in a P frame may be predicted using unidirectional prediction to calculate a single motion vector from a single reference picture list, traditionally a past frame relative to the current frame in terms of display order. In accordance with the emerging HEVC standard, the video blocks may be encoded using either unidirectional prediction to calculate a single motion vector from one of two reference picture lists or bidirectional prediction to calculate two motion vectors from the two reference picture lists. The two reference picture lists may contain past reference pictures or future reference pictures or both past and future reference pictures, for example.

In the example of FIG. 2, final frame 39 is designated for intra-mode coding as an I frame. In other examples, final frame 39 may be coded with inter-mode coding, e.g., as a P frame with reference to final frame 34 of the preceding sequence, which may be an I frame. Video frames 35A-35C (collectively "video frames 35") are designated for coding as B frames using bidirectional prediction with reference to a past frame and a future frame. In the illustrated example, frame 35A is encoded as a B frame with reference to final frame 34 and frame 36A, as indicated by the arrows from frame 34 and frame 36A to video frame 35A. Frames 35B and 35C are similarly encoded.

Video frames 36A-36B (collectively "video frames 36") may be designated for coding as frames using unidirectional prediction with reference to a past frame. In the illustrated example, frame 36A is encoded as a P frame with reference to final frame 34, as indicated by the arrow from frame 34 to video frame 36A. Frame 36B is similarly encoded.

Video frames 38A-38B (collectively "video frames 38") may be designated for coding using bidirectional prediction with reference to the same past frame. In other examples, video frames 38 may be encoded using bidirectional prediction with reference to substantially similar past frames included in the reference picture lists. In the illustrated example, frame 38A is encoded with two references to frame 36A, as indicated by the two arrows from frame 36A to video frame 38A. Frame 38B is similarly encoded.

Figure 3:
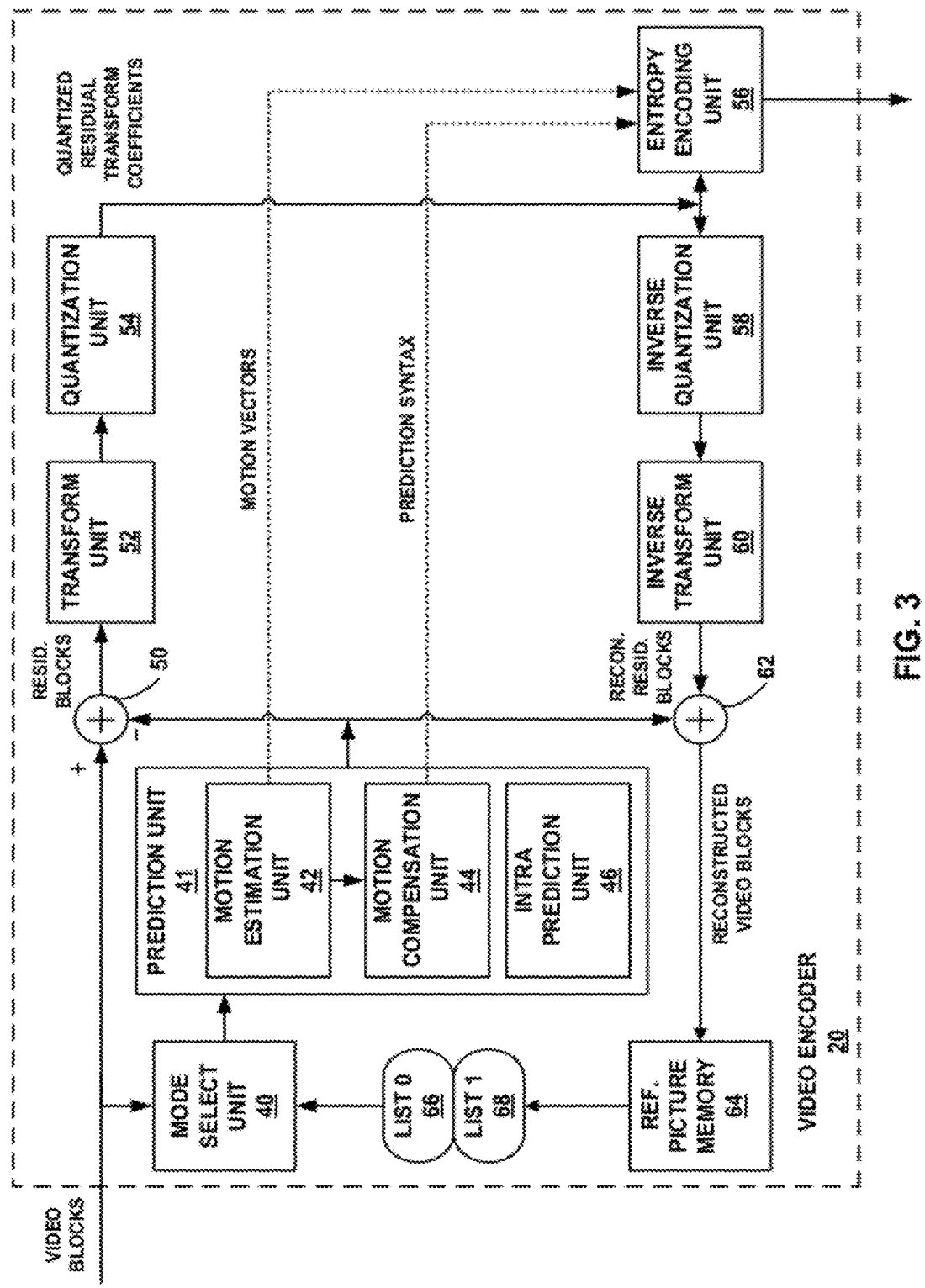
FIG. 3 is a block diagram illustrating an example of a video encoder that may implement techniques described in this disclosure.

FIG. 3 is a block diagram illustrating an example of video encoder 20 that may implement techniques described in this disclosure. Video encoder 20 may perform intra- and inter-coding of video blocks (e.g., coding units such as CUs or PUs) within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I mode) may refer to any of several spatial based compression modes. Inter-modes such as P mode and B mode may refer to any of several temporal-based compression modes.

In the example of FIG. 3, video encoder 20 includes mode select unit 40, prediction unit 41, reference picture memory 64, summer 50, transform unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

As shown in FIG. 3, video encoder 20 receives a current video block within a video frame or slice to be encoded. The frame or slice may be divided into multiple video blocks or CUs. Mode select unit 40 may select one of the coding modes, intra or inter, for the current video block based on error results, and prediction unit 41 may provide the resulting intra- or inter-coded block to summer 50 to generate residual block data and to summer 62 to reconstruct the encoded block for use as a reference picture.

Intra prediction unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression. The one or more reference pictures may be selected from a first reference picture list (List 0) 66 and/or a second reference picture list (List 1) 68. List 0 66 and List 1 68 may be constructed based on decoded reference pictures stored in reference picture memory 64. In general, the reference picture lists may be alternatively referred to as reference frame lists.

Motion estimation unit 42 may be configured to determine the inter-prediction mode for a video frame according to a predetermined pattern for a video sequence. The predetermined pattern may designate video frames in the sequence as P frames or B frames. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block or PU within a current video frame relative to a predictive block within a reference picture. A predictive block is a block that is found to closely match the video block or PU to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a video block or PU of an inter-coded frame by comparing the position of the PU to the position of a predictive block of a reference picture in either List 0 66 or List 1 68. For example, when the predicted video block is a video block of a P frame, motion estimation unit 42 may use unidirectional prediction for that video block in the P frame and calculate a single motion vector from the one of List 0 66 and List 1 68 that includes identifiers for past frames, traditionally List 0 66.

When the predicted video block is a video block of a B frame, for example, List 0 66 and List 1 68 will include identifiers for different reference pictures, traditionally past frames and future frames. Motion estimation unit 42 may use bidirectional prediction for a video block in the B frame and calculate two motion vectors from List 0 66 and List 1 68. In some cases, motion estimation unit 42 may use unidirectional prediction for the video block of the B frame and calculate a single motion vector from one of reference picture lists 66, 68.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. More specifically, in the case of an inter-predicted block, motion compensation unit 44 may construct List 0 66 and List 1 68 from decoded reference pictures stored in reference picture memory 64. Upon receiving the motion vector for the current video block, motion compensation unit 44 may locate the predictive block to which the motion vector points in one of List 0 66 and List 1 68. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation.

Motion compensation unit 44 may also generate syntax elements defined to represent prediction information at one or more of a video sequence level, a video frame level, a video slice level, a video coding unit level, or a video prediction unit level. For example, motion compensation unit 44 may generate syntax elements that indicate List 0 66 and/or List 1 68 at a video slice level or a video frame level. The syntax elements may enable video decoder 30 to reconstruct the reference picture lists, List 0 66 and/or List 1 68, in order to decode encoded video blocks. Entropy encoding unit 56 may then encode the syntax elements and signal the syntax elements to video decoder 30.

The syntax elements for each reference picture list include syntax elements defined to represent a number of reference pictures in the reference picture list, and syntax elements defined to represent reference picture construction commands for the reference picture list. The syntax elements representing reference picture list construction commands may comprise commands that instruct decoder 30 how to initialize the reference picture lists, and a table that instructs decoder 30 how to reorder the reference pictures of the reference picture lists, such as List 0 66 and List 1 68. In some examples, the syntax elements may also include syntax elements defined to represent prediction weights and offsets applied to reference pictures in the reference picture list. The syntax elements representing prediction weights and offsets may comprise a table that instructs decoder 30 to apply certain weight and offset values to each reference picture of the associated reference picture list. In some cases, the prediction weight and offset table may provide different weights and offset for luma and chroma portions of the reference pictures.

In some examples, in addition to the syntax elements described above, motion compensation unit 44 may also include syntax elements that identify each of the reference frames in List 0 66 and List 1 68. There may be at least two ways in which motion compensation unit 44 may identify each of the reference frames in List 0 66 and List 1 68. As one example, motion compensation unit 44 may identify each of the reference frames in List 0 66 and List 1 68 with a frame number value. As another example, motion compensation unit 44 may identify each of the reference frames in List 0 66 and List 1 68 with a picture order count (POC) value.

A frame number value identifies the order in which the reference frames in List 0 66 and List 1 68 are to be decoded by video decoder 30. For example, the reference frames that are to be decoded earlier include a lower frame number value than other reference frames. For example, the reference frame with the lowest frame number value in List 0 66 is decoded earlier than any of the other reference frames identified in List 0 66. The reference frame with next to lowest frame number value in List 0 is decoded after the reference frame with the lowest frame number value and earlier than other reference frames identified in List 0 66, and so forth. The same applies to reference frames identified in List 1 68.

In general, the frame number values for the reference frames within List 0 66 and List 1 68 increase in decoding order. Also, while the frame number values indicate the order in which the reference frames of List 0 66 and List 1 68 are to be decoded, they do not indicate the order in which these reference frames are to be displayed. For example, a reference frame in either List 0 66 or List 1 68 with a frame number value of one is not necessarily the second displayed frame on display device 32 of destination device 14.

In some examples, video encoder 20 may transmit the syntax element frame_num or pic_num that indicates the frame number values of the frame, e.g., picture, which may be the decoding order of pictures. If a picture is lost or corrupted in transmission, video decoder 30 of destination device 14 detects a missing picture based on a gap in the frame number value between successive pictures. The frame number value is explicitly signaled for each frame, and increases in decoding order. The decoding order is different from the display (i.e., presentation) order of the pictures. The frame number value also may be used to identify pictures as long term or short term reference pictures, or as pictures that are unused for reference in the decoding process.

A POC value identifies the order in which the reference frames in List 0 66 and List 1 68 are to be displayed by display device 32. For example, the reference frame with the lowest POC value in List 0 66 is displayed earlier than any of the other reference frames identified in List 0 66. The reference frame with next to lowest POC value in List 0 is displayed after the reference frame with the lowest POC value and earlier than other reference frames identified in List 0 66, and so forth. The same applies to reference frames identified in List 1 68.

In contrast to frame number values, the POC values indicate the order in which the reference frames of List 0 66 and List 1 68 are to be displayed, but do not indicate the order in which these reference frames are to be decoded. For example, a reference frame in either List 0 66 or List 1 66 with a POC value of five is not necessarily the sixth decoded frame by video decoder 30 of destination device 14.

In other words, the POC value indicates the timing or output ordering of each picture within a sequence of pictures. In some examples, the POC value has a value that is non-decreasing with increasing picture position in output order relative to the first output picture of the previous picture, which may be an Instantaneous Display Refresh (IDR) picture, in decoding order or relative to the first output picture of the previous picture, in decoding order, that contains a memory management control operation that marks all reference pictures as "unused for reference."

In accordance with the techniques of this disclosure, in one example, video encoder 20 may transmit the frame number values or the POC values for the reference pictures of List 0 66 and List 1 68 based on the default construction technique that video decoder 30 utilizes to construct the combined reference picture list. For instance, in one example, video decoder 30 may construct the combined reference picture list that includes one or more reference pictures from both List 0 66 and List 1 68 based on the frame number values of the reference pictures of List 0 66 and List 1 68. In another example, video decoder 30 may construct the combined reference picture list that includes one or more reference pictures from both List 0 66 and List 1 68 based on the POC values of the reference pictures of List 0 66 and List 1 68. In this example, video decoder 30 may possibly construct List 0 66 and List 1 68 from the POC values. Also, in this example, video decoder 30 may also reorder the reference pictures of the combined reference picture list using the POC values and without using the frame number values.

It should be understood that the frame number values and the POC values of List 0 and List 1 are not syntax elements of the combined reference picture list that is constructed by video decoder 30. Rather, the frame number values and the POC values are syntax elements of the reference frames of List 0 66 and List 1 68. In some examples where video decoder 30 is capable of implementing different default construction techniques, motion compensation unit 44 may include both the frame number values and the POC values in the signaled syntax elements for List 0 66 and List 1 68. In these examples, video encoder 20 may indicate which default construction technique video decoder 30 should implement, and video decoder 30 may utilize the frame number values or the POC values to implement the indicated default construction technique. However, because reduction in the amount of bits that video encoder 20 needs to transmit is desirable, not all examples of video decoder 30 need to be able to implement more than one default construction technique. For this, in some examples, video decoder 30 may implement one default construction technique that utilizes either frame number values or POC values.

The example functions of video encoder 20, of FIG. 2, are described for the default construction techniques that are to be performed by video decoder 30. For the default mapping techniques (e.g., examples where video decoder 30 receives information for how to construct the combined reference picture list), motion compensation unit 44 may also transmit syntax elements for a combined reference picture list. The combined reference picture list may be a combination of reference pictures from List 0 66 and List 1 68 that indicate from which frame, of either List 0 66 or List 1 68, a particular video block is to be decoded. Video decoder 30 may construct the combined reference picture list from the syntax elements of the combined reference picture list. In the default mapping techniques, in one example, motion compensation unit 44 may transmit the syntax elements for the frame number values for the reference pictures in the combined reference picture list. In the default mapping techniques, in an alternate example, motion compensation unit 44 may transmit the syntax elements for the POC values for the reference pictures in the combined reference picture list.

Furthermore, in some examples, motion compensation unit 44 may also include the inter_pred_idc syntax element for each of the unidirectional video blocks of a B frame. In some examples, the inter_pred_idc syntax element may be at a frame level, slice level, or video block level (e.g., coding unit level). As described above, the inter_pred_idc syntax element value of Bi indicates to video decoder 30 that a video block is predicted with reference to frames in both List 0 and List 1.

Also, the inter_pred_idc syntax element value of Pred_LC indicates to video decoder 30 that a video block is predicted with reference to the combined reference picture list (List C), which video decoder 30 constructs utilizing the default construction techniques of this disclosure, in some examples where video decoder 30 does not receive the syntax elements identifying the contents of the combined reference picture list.

The techniques described in this disclosure enable video encoder 20 to predict video blocks of frames with respect to reference pictures in one or both of the reference picture lists, List 0 66 and List 1 68. For example, when motion estimation unit 42 uses bidirectional prediction for the video block of a frame and calculates two motion vectors from List 0 66 and List 1 68, video encoder 20 may encode the first motion vector with respect to reference pictures of List 0 66 and the second motion vector with respect to reference pictures of List 1 68. Then, motion compensation unit 44 may generate syntax elements indicating a number of reference pictures and reference picture list construction commands for List 0 66 and List 1 68.

In some examples, video encoder 20 may also encode syntax elements indicating prediction weights and offsets for one of the reference picture lists. In that case, the same weight and offset values are applied to reference pictures in the first and second reference frame lists. In other examples, video encoder 20 may encode separate syntax elements indicating different prediction weights and offsets for each of the first and second reference picture lists. In this case, different weight and offset values may be applied to reference frames in each of the first and second reference frame lists.

As described above, part of the prediction syntax is the number of reference frames in each of List 0 66 and List 1 68 that allow video decoder 30 to construct List 0 and List 1 at the decoder end. For this, if a video slice of the current video frame is considered a P slice or a B slice, motion compensation unit 44 generates a syntax element, num_ref_idx_10_active_minus1, to represent a number of active reference pictures included in List 0 66. Then, motion compensation unit 44 generates a syntax element num_ref_idx_11_active_minus1, to represent a number of reference pictures included in List 1 68.

In any of the above examples, motion compensation unit 44 also generates syntax elements defined to represent reference picture list construction commands, including reference picture reordering, for reference pictures within List 0 66 and List 1 68. The syntax elements representing reference picture list reordering may comprise a table that instructs decoder 30 how to reorder the reference pictures of the first reference picture list, List 0 66, and how to reorder the reference pictures of the second reference picture list, List 1 68. The syntax for the reference picture list modification table is presented in Table 1 below to encode reference picture list construction commands, with respect to the frame number values, for List 0 66 and List 1 for an encoded video frame.

TABLE 1

| ref_pic_list_modification( ) { | C | Descriptor |
|---|---|---|
| if( slice_type % 5 != 2 ) { // inter-mode slice type | | |
|     ref_pic_list_modification_flag_l0 | 2 | u(1) |
|     if( ref_pic_list_modification_flag_l0 ) | | |
|         do { | | |
|             modification_of_pic_nums_idc | 2 | u(1) |
|             if(modification_of_pic_nums_idc = = 0 ‖ | | |
|                 modification_of_pic_nums_idc = = 1 ) | | |

TABLE 1-continued

| ref_pic_list_modification( ) { | C | Descriptor |
|---|---|---|
|         abs_diff_pic_num_minus1 | 2 | ue(v) |
|       else ( modification_of_pic_nums_idc = = 2 ) | | |
|         long_term_pic_num | 2 | ue(v) |
|     } while( modification_of_pic_nums_idc != 3 ) | | |
| } | | |
|   if( slice_type % 5 = = 1 && !slice_gbp_flag ) { // conventional B slice type | | |
|     ref_pic_list_modification_flag_l1 | 2 | u(1) |
|     if( ref_pic_list_modification_flag_l1 ) | | |
|       do { | | |
|         modification_of_pic_nums_idc | 2 | u(1) |
|         if(modification_of_pic_nums_idc = = 0 || modification_of_pic_nums_idc = = 1 ) | | |
|         abs_diff_pic_num_minus1 | 2 | ue(v) |
|       else if( modification_of_pic_nums_idc = = 2 ) | | |
|         long_term_pic_num | 2 | ue(v) |
|     } while( modification_of_pic_nums_idc != 3 ) | | |
|   } | | |
| } | | |

As shown in the syntax excerpt of Table 1, if the video slice of a current video frame is considered an inter-mode slice video encoder 20 may signal the modification flag, ref_pic_list_modification_flag_l0, to indicate that the reference pictures of the first reference picture list, List 0 66, are reordered. Video encoder 20 may also signal the modification flag, ref_pic_list_modification_flag_l1, to indicate that the reference pictures of the second reference picture list, List 1 68, are reordered.

In Table 1, the syntax for the reference picture list modification table is presented for examples where the reference pictures of List 0 66 and List 68 are indicated with their frame number values. For example, the "pic_num" in the above syntax elements refers to frame number values. Accordingly, the above reordering table may be beneficial to video decoder 30 to construct the combined reference picture list when video encoder 20 transmits the syntax elements for the frame number values for the reference pictures of List 0 66 and List 1 68.

However, in some examples, video decoder 30 may construct the combined reference picture list from the POC values of the reference pictures of List 0 66 and List 1 68, rather than frame number values. For instance, in these examples, rather than transmitting syntax elements for the frame number values for the reference pictures in List 0 66 and List 1 68, video encoder 20 may transmit the syntax elements for the POC values for the reference pictures in List 0 66 and List 1 68. In these examples, the reordering may be based on the POC values and not the frame number values. In some examples, the reordering may be performed only with the POC values. The syntax for the reference picture list modification table is presented in Table 2 below to encode reference picture list construction commands, with respect to the POC values, for List 0 66 and List 1 for an encoded video frame. The "poc_num" in the below syntax elements refers to POC values.

TABLE 2

| ref_pic_list_poc_reordering( ) { | Descriptor |
|---|---|
|   if( slice_type != I && slice_type != SI ) { | |
|     ref_pic_list_poc_reordering_flag_l0 | u(1) |
|     if( ref_pic_list_poc_reordering_flag_l0 ) | |
|       do { | |

TABLE 2-continued

| ref_pic_list_poc_reordering( ) { | Descriptor |
|---|---|
|         reordering_of_poc_nums_idc | ue(v) |
|         if( reordering_of_poc_nums_idc = = 0 || reordering_of_poc_nums_idc = = 1 ) | |
|         abs_diff_poc_num_minus1 | ue(v) |
|     } while( reordering_of_poc_nums_idc != 3 ) | |
|   } | |
|   if( slice_type = = B ) { | |
|     ref_pic_list_poc_reordering_flag_l1 | u(1) |
|     ref_pic_list_poc_reordering_flag_lc | |
|     if( ref_pic_list_poc_reordering_flag_l1 ) | |
|       do { | |
|         reordering_of_poc_nums_idc | ue(v) |
|         if( reordering_of_poc_nums_idc = = 0 || reordering_of_poc_nums_idc = = 1 ) | |
|         abs_diff_poc_num_minus1 | ue(v) |
|     } while( reordering_of_poc_nums_idc != 3 ) | |
|     if ( ref_pic_list_poc_reordering_flag_lc ) | |
|       do { | |
|         reordering_of_poc_nums_idc | ue(v) |
|         if( reordering_of_poc_nums_idc = = 0 || reordering_of_poc_nums_idc = = 1 ) | |
|         abs_diff_poc_num_minus1 | ue(v) |
|     } while( reordering_of_poc_nums_idc != 3 ) | |
|   } | |
| } | |

In Table 2, ref_pic_list_poc_reordering_flag_l0 equal to 1 specifies that the syntax element reordering_of_poc_nums_idc is present for specifying reference picture list 0. ref_pic_list_poc_reordering_flag_l0 equal to 0 specifies that this syntax element is not present. When ref_pic_list_poc_reordering_flag_l0 is equal to 1, the number of times that reordering_of_poc_nums_idc is not equal to 3 following ref_pic_list_poc_reordering_flag_l0 shall not exceed num_ref_idx_l0_active_minus1+1. When RefPicList0 [num_ref_idx_l0_active_minus1] in the initial reference picture list is equal to "no reference picture," ref_pic_poc_list_reordering_flag_l0 shall be equal to 1 and reordering_of_poc_nums_idc shall not be equal to 3 until RefPicList0[num_ref_idx_l0_active_minus1] in the reordered list produced is not equal to "no reference picture."

Also, in Table 2, ref_pic_list_poc_reordering_flag_lc equal to 1 specifies that the syntax element reordering_of_poc_nums_idc is present for specifying the combined reference picture list. ref_pic_list_poc_reordering_flag_lc equal to 0 specifies that this syntax element is not present.

When ref_pic_list_poc_reordering_flag_lc is equal to 1, the number of times that reordering_of_poc_nums_idc is not equal to 3.

Table 3 below provides an overview of the reordering operations on the POC values.

TABLE 3

| reordering_of_poc_nums_idc operations for reordering of reference picture lists | |
|---|---|
| reordering_of_poc_nums_idc | Reordering specified |
| 0 | abs_diff_poc_num_minus1 is present and corresponds to a difference to subtract from a picture number prediction value |
| 1 | abs_diff_poc_num_minus1 is present and corresponds to a difference to add to a picture number prediction value |
| 2 | End loop for reordering of the initial reference picture list |

In the reordering process of Table 2, the reference pictures may be long-term pictures. The following pseudo-code represents an example reordering process for reference pictures of List 0 66 or List 1 68 that are short-term pictures. The following pseudo-code for short-term pictures may be applicable to examples where the reference pictures of List 0 66 and List 1 68 are identified with respect to their POC values.

Inputs to this process are reference picture list RefPicListX (with X being 0 or 1) and an index refIdxLX into this list. Outputs of this process are a possibly modified reference picture list RefPicListX (with X being 0 or 1) and the incremented index refIdxLX.

The variable picPOCLXNoWrap may be derived as follows.

```
If reordering_of_poc_nums_idc is equal to 0
        if( pocNumLXPred − ( abs_diff_poc_num_minus1 +
1 ) < 0 )
            pocNumLXNoWrap = pocNumLXPred −
( abs_diff_poc_num_minus1 + 1 ) + MaxPocNum
else
            pocNumLXNoWrap = pocNumLXPred −
( abs_diff_poc_num_minus1 + 1 )
    Otherwise (reordering_of_poc_nums_idc is equal to 1),
        if( pocNumLXPred + ( abs_diff_poc_num_minus1 + 1 ) >=
MaxPocNum )
            pocNumLXNoWrap = pocNumLXPred +
( abs_diff_poc_num_minus1 + 1 ) − MaxPocNum
else
            pocNumLXNoWrap = pocNumLXPred +
( abs_diff_pic_num_minus1 + 1 )
    pocNumLXPred is the prediction value for the variable
pocNumLXNoWrap.
```

When the process specified in this section is invoked the first time for a slice (that is, for the first occurrence of reordering_of_poc_nums_idc equal to 0 or 1 in the ref_poc_list_reordering( ) syntax), pocNumL0Pred and pocNumL1Pred are initially set equal to CurrPOCNum (the POC number of the current picture). After each assignment of pocNumLXNoWrap, the value of pocNumLXNoWrap is assigned to pocNumLXPred.

The variable pocNumLX is derived as follows

```
if( pocNumLXNoWrap > CurrPOCNum )
    pocNumLX = pocNumLXNoWrap − MaxPocNum
```

```
else
    pocNumLX = pocNumLXNoWrap
``` pocNumLX shall specify a reference picture that is marked as "used for short-term Refernce" and shall not specify a short-term reference picture that is marked as "non-existing."

The following procedure may then be conducted to place the picture with short-term picture number pocNumLX into the index position refIdxLX, shift the position of any other remaining pictures to later in the list, and increment the value of refIdxLX.

```
for( cIdx = num_ref_idx_lX_active_minus1 + 1; cIdx >
refIdxLX; cIdx−− )
    RefPicListX[ cIdx ] = RefPicListX[ cIdx − 1]
RefPicListX[ refIdxLX++ ] = pocNumLX
nIdx = refIdxLX
for( cIdx = refIdxLX; cIdx <= num_ref_idx_lX_active_minus1 + 1;
cIdx++ )
    if( LongTermEntry( RefPicListX[ cIdx ] ) | | RefPicListX[ cIdx ] !=
pocNumLX )
        RefPicListX[ nIdx++ ] = RefPicListX[ cIdx ]
```

If the reference pictures of the List 0 66 are reordered, motion compensation unit 44 generates syntax elements that indicate how the reference pictures of the first reference picture list, List 0 66, are reordered. The syntax elements may define whether the reordered reference picture lists are short term reference pictures of List 0 66, long term reference picture of List 0 66, and how the reference pictures are reordered. For example, the syntax elements may define an offset from the frame of the predictive block in the case of short term reference picture reordering, and may assign a new index number to the frame in the case of long term reference picture reordering. Motion compensation unit 44 generates similar syntax elements for the second reference picture list, List 1 68, when the reference pictures of List 1 68 are reordered.

In some examples, if the current video frame is considered an inter-mode slice, motion compensation unit 44 generates syntax elements that indicate the prediction weight and offset values applied to each of the reference pictures of the first reference picture list, List 0 66. The syntax elements may define separate prediction weights and offsets for the luma and chroma portions of the reference pictures of List 0 66. In some examples, motion compensation unit 44 may encode syntax elements indicating prediction weights and offsets for List 0 66 and List 1 68. These prediction weights may be the same or different prediction weights.

After motion compensation unit 44 generates the predictive block for the current video block, video encoder 20 forms a residual video block by subtracting the predictive block from the current video block. Transform unit 52 may form one or more transform units (TUs) from the residual block. Transform unit 52 applies a transform, such as a discrete cosine transform (DCT) or a conceptually similar transform, to the TU, producing a video block comprising residual transform coefficients. The transform may convert the residual block from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval (e.g., via storage medium 17 and/or server 19).

Entropy encoding unit 56 may also entropy encode the motion vectors and the other prediction syntax elements for the current video frame being coded. For example, entropy encoding unit 56 may construct header information that includes appropriate syntax elements generated by motion compensation unit 44 for transmission in the encoded bitstream. At the video slice level, the syntax elements may include reference picture list construction commands for List 0 66 and/or List 1 68. Video decoder 30 may use these syntax elements to construct the reference picture lists and reconstruct the original video blocks encoded by video encoder 20.

The syntax elements, encoded by entropy encoding unit 56, may also include frame number values and/or POC values for the reference pictures of List 0 66 and List 1 68. Video decoder 30 may use these syntax elements for frame number values and/or POC values to construct List 0 and List 1 from which video decoder 30 constructs the combined reference picture list at the destination device 14. Furthermore, as part of the encoding of the syntax elements, entropy encoding unit 56 may also encode the inter_pred_idc syntax element that indicates to video decoder 30 whether to decode a prediction unit based on the reference frames of both List 0 and List 1, e.g., the inter_pred_idc syntax element value is Bi for the prediction unit, or decode a prediction unit based on the reference frames of the constructed combined reference picture list, e.g., the inter_pred_idc syntax element value is Pred_LC for the prediction unit.

To entropy encode the syntax elements, entropy encoding unit 56 may perform CABAC and binarize the syntax elements into one or more binary bits based on a context model. Entropy encoding unit may also perform CAVLC and encode the syntax elements as codewords according to probabilities based on context.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within List 0 66 or List 1 68. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame.

Figure 4:
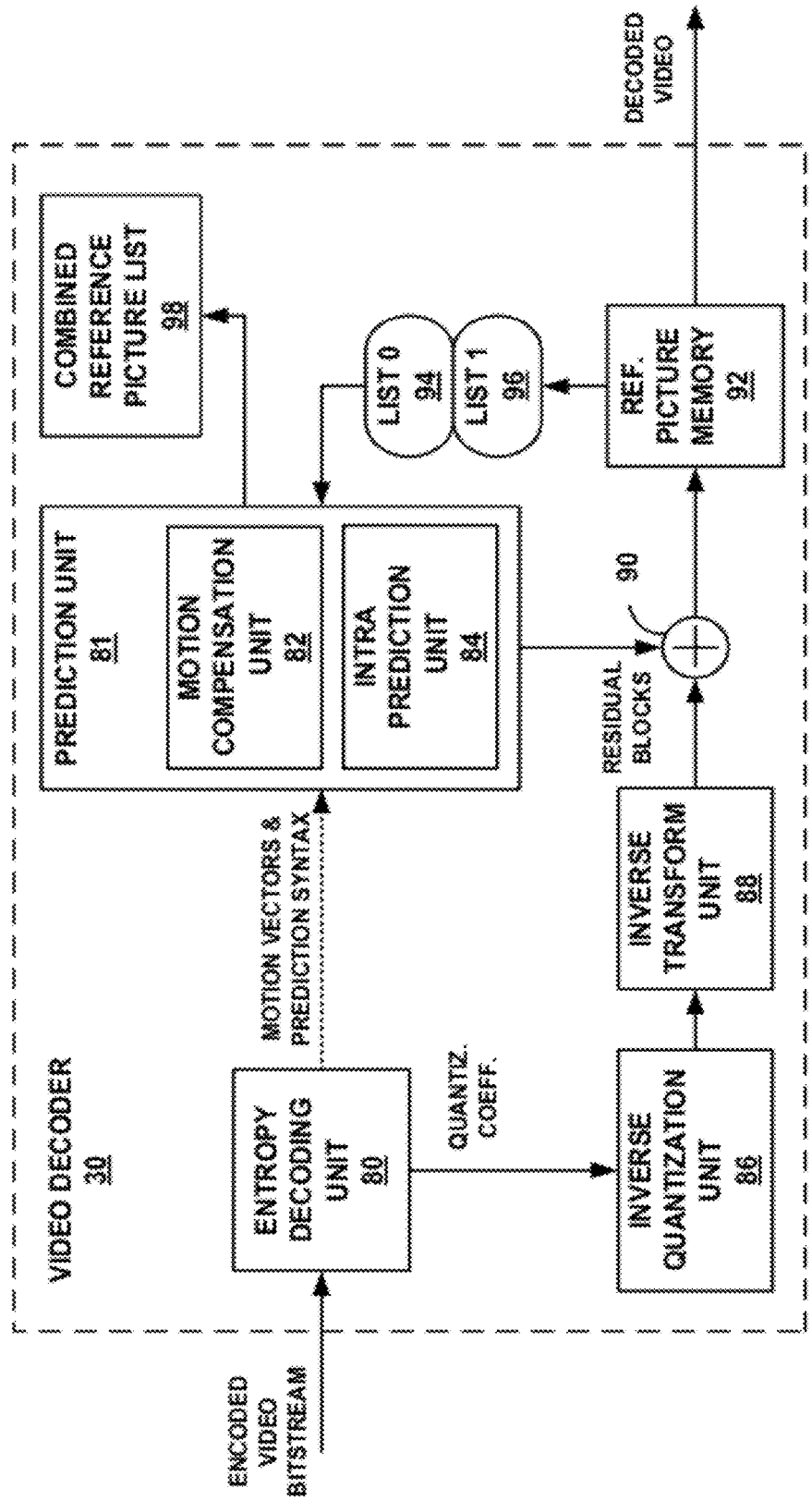
FIG. 4 is a block diagram illustrating an example of a video decoder that may implement techniques described in this disclosure.

FIG. 4 is a block diagram illustrating an example video decoder 30 that may implement default construction techniques for constructing a combined reference picture list, or mapping reference pictures of the combined reference picture list. Again, the combined reference picture list may allow video decoder 30 to decode unidirectional predicted video blocks of a B frame or slice, or GPB frame or slice, that have been coded with respect to a combined reference picture list. In the example of FIG. 4, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 (FIG. 3).

During the decoding process, video decoder 30 receives an encoded video bitstream that includes an encoded video frame and syntax elements that represent coding information from a video encoder, such as video encoder 20, from a previously encoded video stream (e.g., live streaming or previously encoded and stored video on a server such as server 19), or from a local disk, such as storage medium 17, in which no communication with an encoder is needed. There may other ways in which video decoder 30 receives the video, and the techniques of this disclosure should not be considered limited to the specific examples above. Entropy decoding unit 80 of video decoder 30 entropy decodes the bitstream to generate quantized coefficients, motion vectors, and other prediction syntax. For example, the prediction syntax may include syntax elements such as frame number values or picture order count (POC) values for reference frames of List 0 66 and List 1 68, as described above with respect to FIG. 2. The prediction syntax may also include construction commands, as well as syntax elements that indicate which prediction units are encoded with respect to a combined reference picture list.

Entropy decoding unit 80 forwards the motion vectors and other prediction syntax to prediction unit 81. Video decoder 30 may receive the syntax elements at the video prediction unit level, the video block level (e.g., coding unit level), the video slice level, the video frame level, and/or the video sequence level.

When the video frame is coded as an intra-coded (I) frame, intra prediction unit 84 of prediction unit 81 may generate prediction data for a video block of the current video frame based on a signaled intra prediction mode and data from previously decoded blocks of the current frame. When the video frame is coded as an inter-coded (i.e., B, P, or GPB), motion compensation unit 82 of prediction unit 81 produces predictive blocks for a video block of the current video frame based on the motion vectors and prediction syntax received from entropy decoding unit 80. The predictive blocks may be produced from one or more of a first reference picture list (List 0) 94 and a second reference picture list (List 1) 96. List 0 94 and List 1 96 may be constructed based on reference pictures stored in reference picture memory 92.

Motion compensation unit 82 determines prediction information for the current video block by parsing the motion vectors and prediction syntax, and uses the prediction information to produce the predictive blocks for the current video block being decoded. For example, motion compensation unit 82 uses some of the received syntax elements to determine sizes of CUs used to encode the current frame, split information that describes how each CU of the frame is split, modes indicating how each split is encoded (e.g., intra- or inter-prediction), an inter-prediction slice type (e.g., B slice or P slice), reference picture list construction commands for one or more reference picture lists for the frame, frame numbers or POC values for the one or more reference pictures in the reference picture lists for the frame, motion vectors for each inter-predicted video block of the frame, motion prediction direction for each inter-predicted video block of the frame, and other information to decode the current video frame.

Motion compensation unit 82 may also perform interpolation based on interpolation filters. Motion compensation unit 82 may use interpolation filters as used by video encoder 20 during encoding of the video block to calculate interpolated values for sub-integer pixels of a reference block. Motion compensation unit 82 may determine the interpolation filters used by video encoder 20 from the received syntax elements and use the interpolation filters to produce predictive blocks.

Motion compensation unit 82 may parse the syntax at the video slice level or the video frame level to determine reference picture list construction commands for the current video frame. According to the techniques, for a current video frame, video decoder 30 may expect to receive and decode reference list syntax elements indicating a number of reference pictures and reference picture list construction commands for the first reference picture list, List 0 94, and the second reference picture list, List 1 96.

It may not be necessary for video decoder 30 to receive reference picture list construction commands to construct List 0 94 and List 1 96 in every example. In general, video decoder 30 may utilize any technique to construct List 0 94 and List 1 96, including techniques where video decoder 30 receives full construction commands, partial construction commands, or no construction commands indicating the manner in which video decoder 30 should construct List 0 94 and List 1 96.

In some examples, video decoder 30 may construct the first reference picture list, List 0 94, and perform similar functions in order to construct the second reference picture list, List 1 96. For purposes of brevity, the example techniques for constructing List 0 94 are described in more detail with the understanding that video decoder 30 may perform similar functions to construct List 1 96. However, the example techniques for constructing List 0 94 and List 1 96 should not be considered as limiting.

In order to construct List 0 94, video decoder 30 performs reference picture list initialization and reference picture list reordering (i.e., modification) for the List 0 94 using the syntax elements indicating reference picture list construction commands for List 0 94. In one example, video decoder 30 may perform the reference picture list initialization of List 0 94 for a P frame. More specifically, video decoder 30 may initialize the first reference picture list, List 0 94, by placing the reference pictures into an initialization list based on a descending decoding order, or frame number, of the reference pictures. In another example, video decoder 30 may perform the reference picture list initialization of List 0 94 for List 0 of a B frame. More specifically, video decoder 30 may initialize the first reference picture list, List 0 94, by placing the reference pictures into an initialization list based on descending display order, or POC (picture order count) values, of the reference pictures.

For example, as described above, part of the explicit signaling received by video decoder 30 from video encoder 20 includes frame number values or POC values for the reference frames of List 0 66 and List 1 68. In one example, video decoder 30 may utilize frame number values to construct List 0 94 and List 1 96. After construction of List 0 94 and List 1 96, video decoder 30 may utilize the frame number values of the reference frames of each of List 0 94 and List 1 96 to construct combined reference picture list 98. In another example, video decoder 30 may utilize POC values to construct List 0 94 and List 1 96. After construction of List 0 94 and List 1 96, video decoder 30 may utilize the POC values of the reference frames of each of List 0 94 and List 1 96 to construct combined reference picture list 98. Again, the frame number values and the POC values may be explicitly signaled by video encoder 20.

Video decoder 30 may then perform reference picture list reordering for List 0 94 using the syntax elements indicating reference picture list construction commands. The syntax elements representing reference picture list modification may comprise a table that instructs decoder 30 how to reorder the reference pictures of List 0 94. Video decoder 30 may modify a position of a reference picture placed in the initialization list during the reference picture list initialization step to any other position, and may place any reference picture stored in reference picture memory 92 into the initialization list at any position. If a reference picture is reordered to a position in the initialization list that exceeds the number of active reference pictures of the list, the reference picture may not be considered an active reference picture in the first reference picture list, List 0 94. As described above, video decoder 30 receives the number of active reference pictures for List 0 94 in the syntax elements from video encoder 20.

For instance, in some examples, if video encoder 20 reordered the reference pictures of List 0 66 and List 1 68, video decoder 30 may construct List 0 94 and List 1 96 based on the syntax elements of Tables 1-3 and the pseudo-code above. For example, if video encoder 20 reordered the reference pictures of List 0 66 and List 1 68 with respect to their frame number values, video decoder 30 may construct List 0 94 and List 1 96 utilizing the syntax of Table 1. If video encoder 20 reordered the reference pictures of List 0 66 and List 1 68 with respect to their POC values, video decoder 30 may construct List 0 94 and List 1 96 utilizing the syntax of Tables 2 and 3 and the pseudo-code provided above.

Video decoder 30 may also apply prediction weights and offsets to reference pictures in the first reference picture list using the syntax elements indicating weight and offset values of the reference pictures. The syntax elements representing prediction weights and offsets may comprise a table that instructs decoder 30 to apply certain weight and offset values to each reference picture of List 0 94. In some examples, video decoder 30 may only decode syntax elements indicating prediction weights and offsets of List 0 94. In that case, the same weight and offset values are applied to reference pictures in List 0 94 and List 1 96. In other examples, video decoder 30 may decode separate syntax elements indicating different prediction weights and offsets for each of List 0 and List 1. In this case, different weight and offset values may be applied to reference frames in each of List 0 94 and List 1 96.

Video decoder 30 may create the second reference picture list, List 1 96, in a substantially similar manner to List 0 94. In some examples, video decoder 30 may construct the first reference picture list, List 0 94, and the second reference picture list, List 1 96, in parallel, or construct one before the other. In some other examples, video decoder 30 may first construct the second reference picture list, List 1 96, and then construct the first reference picture list, List 0 94.

In addition, motion compensation unit 82 may parse the syntax at the video slice level, the video frame level, or the video sequence level to determine whether a current video block of a B frame or GPB frame is unidirectional predicted based on an explicitly signaled syntax elements, e.g., inter_pred_idc syntax element, described above. This syntax element may be used to explicitly inform video decoder 30 that the current video block is predicted with unidirectional motion vectors or bidirectional motion vectors. The explicit signaling may enable video decoder 30 to properly parse the syntax elements.

Inverse quantization unit 86 inverse quantizes, i.e., dequantizes, the quantized transform coefficients provided in the bitstream and decoded by entropy decoding unit 80. The inverse quantization process may include use of a quantization parameter $QP_Y$ calculated by video encoder 20 for each video block or CU to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and prediction syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks are then stored in reference picture memory 92, which provides reference blocks of reference pictures for subsequent motion compensation. Reference picture memory 92 also produces decoded video for presentation on a display device, such as display device 32 of FIG. 1.

As described above, video decoder 30 may construct combined reference picture list 98. In accordance with this disclosure, video decoder 30 may implement default construction techniques to construct combined reference picture list 98 from List 0 94 and List 96. In particular, video decoder 30 need not receive explicit construction commands to construct combined reference picture list 98. In this manner, video decoder 30 may be capable of constructing combined reference picture list 98 without receiving construction commands, which reduces the amount of information that video encoder 20 needs to signal, and the amount of information that video decoder 30 needs to receive. For example, video decoder 30 may construct combined reference picture list 98 without decoding instructions from video encoder 20 that instruct a manner in which to construct the combined reference picture list 98.

There may be at least two default construction techniques that video decoder 30 may implement to construct combined reference picture list 98. These two default construction techniques are referred to as option one and option two. In option one, video decoder 30 utilizes frame number values for the reference frames of List 0 94 and List 1 96 to construct combined reference picture list 98. In option two, video decoder 30 utilizes POC values for the reference frames of List 0 94 and List 1 96 to construct combined reference picture list 98.

There may be at least four examples of sub-options to option one. In other words, there may be four example default construction techniques, to construct combined reference picture list 98, that utilize frame number value of the reference frames of List 0 94 and List 1 96, consistent with option one. In two of the four sub-options, video decoder 30 may sort the frame number values of the reference frames of List 0 94 and List 1 96. In the other two of the four sub-options, video decoder 30 need not sort the frame number values of the reference frames of List 0 94 and List 1 96. In accordance with the techniques, in all four sub-options of option one, video decoder 30 may rely on the frame numbers for the construction of combined reference picture list 98.

In general, in option one of the default construction techniques, video decoder 30 may place reference frame number values from each of List 0 94 and List 1 96 into combined reference picture list 98. However, if both List 0 94 and List 1 96 include at least some same reference frame number values, i.e., a reference frame in List 0 is a duplicate of a reference frame in List 1 and therefore bears the same frame number, video decoder 30 may place only one of these duplicate reference frame number values into combined reference picture list 98. For example, video decoder 30 may alternately insert one of the frame number values of one of the reference pictures from the first reference picture list (List 0 94) and one of the frame number values of one of the reference pictures from the second reference picture list (List 1 96) if a frame number value for a reference picture from either the first or second reference picture list does not already exist in the combined reference picture list 98.

In accordance with sub-option one of option one, video decoder 30 may sort the frame number values in List 0 94 into descending order (e.g., largest frame number value to smallest frame number value), and store the sorted frame number values of List 0 94 in a sorted_frame_number_list0 buffer of video decoder 30. In this case, video decoder 30 may sort the frame number values in List 1 96 into ascending order (e.g., smallest frame number value to largest frame number value), and store the sorted frame number values of List 1 96 in a sorted_frame_number_list1 buffer of video decoder 30. Again, the frame number values indicate the order in which the frames that are referred to by their respective frame number values are decoded by video decoder 30.

In sub-option one of option one, if the sorted_frame_number_list0 buffer is not empty, video decoder 30 may insert a first reference frame value from the sorted_frame_number_list0 buffer into combined reference picture list 98 when that reference frame value from sorted_frame_number_list0 buffer does not already exist in combined reference picture list 98. Video decoder 30 may then delete the first reference frame value from the sorted_frame_number_list0 buffer. For example, video decoder 30 may delete the first reference frame value regardless of whether video decoder 30 inserted the first reference frame value of the sorted_frame_number_list0 buffer into combined reference picture list 98.

Video decoder 30 may perform a similar function with the first reference frame number value stored in the sorted_frame_number_list1 buffer. For example, if the sorted_frame_number_list1 buffer is not empty, video decoder 30 may insert a first reference frame value from the sorted_frame_number_list1 buffer into combined reference picture list 98 when that reference frame number value from sorted_frame_number_list1 buffer does not already exist in combined reference picture list 98. Video decoder 30 may then delete the first reference frame number value from the sorted_frame_number_list1 buffer. For example, video decoder 30 may delete the first reference frame value regardless of whether video decoder 30 inserted the first reference frame value of the sorted_frame_number_list1 buffer into combined reference picture list 98.

Video decoder 30 may then repeat these steps. For example, video decoder 30 may perform similar functions on the second reference frame value stored in the sorted_frame_number_list0 buffer, then perform similar functions on the second reference frame value stored in the sorted_frame_number_list1 buffer, then the third reference frames values in each of the sorted_frame_number_list0 buffer and the sorted_frame_number_list1 buffer. Video decoder 30 may repeat these steps until both the sorted_frame_number_list0 buffer and the sorted_frame_number_list1 buffer are empty. In this manner, video decoder 30 may construct combined reference picture list 98 in accordance with sub-option one of option one of the default construction techniques.

Sub-option two of option one may be the inverse of sub-option one of option two. For example, in accordance with sub-option two of option one, video decoder 30 may sort the frame number values in List 0 94 into ascending order, and store the sorted frame number values of List 0 94 in a sorted_frame_number_list0 buffer of video decoder 30. In this case, video decoder 30 may sort the frame number values in List 1 96 into descending order, and store the sorted frame number values of List 1 96 in a sorted_frame_number_list1 buffer of video decoder 30.

In sub-option two of option one, if the sorted_frame_number_list1 buffer is not empty, video decoder 30 may insert a first reference frame value from the sorted_frame_number_list1 buffer into combined reference picture list 98 when that reference frame value from sorted_frame_number_list1 buffer does not already exist in combined reference picture list 98. Video decoder 30 may then delete the first reference frame value from the sorted_frame_number_list1 buffer.

Video decoder 30 may perform a similar function with the first reference frame number value stored in the sorted_frame_number_list0 buffer. For example, if the sorted_frame_number_list0 buffer is not empty, video decoder 30 may insert a first reference frame value from the sorted_frame_number_list0 buffer into combined reference picture list 98 when that reference frame value from sorted_frame_number_list0 buffer does not already exist in combined reference picture list 98. Video decoder 30 may then delete the first reference frame value from the sorted_frame_number_list1 buffer.

Video decoder 30 may then repeat these steps. For example, video decoder 30 may perform similar functions on the second reference frame value stored in the sorted_frame_number_list1 buffer, then perform similar functions on the second reference frame value stored in the sorted_frame_number_list0 buffer, then the third reference frames values in each of the sorted_frame_number_list1 buffer and the sorted_frame_number_list0 buffer. Video decoder 30 may repeat these steps until both the sorted_frame_number_list1 buffer and the sorted_frame_number_list0 buffer are empty. In this manner, video decoder 30 may construct combined reference picture list 98 in accordance with sub-option two of option one of the default construction techniques.

Sub-options three and four of option one may differ from sub-options one and two of option one by not requiring the sorting of the reference frame number values of List 0 94 and List 1 96 into ascending or descending order. For example, in accordance with sub-option three of option one, video decoder 30 may store the reference frame number values of List 0 94 into an unsorted_frame_number_list0 buffer, and store the reference frame number values of List 1 96 into an unsorted_frame_number_list1 buffer.

In sub-option three of option one, if unsorted_frame_number_list0 buffer is not empty, video decoder 30 may insert a first reference frame value from the unsorted_frame_number_list0 buffer into combined reference picture list 98 when that reference frame value from unsorted_frame_number_list0 buffer does not already exist in combined reference picture list 98. Video decoder 30 may then delete the first reference frame value from the unsorted_frame_number_list0 buffer regardless of whether video decoder 30 inserted the first reference frame value of the unsorted_frame_number_list0 into combined reference picture list 98.

Video decoder 30 may perform a similar function with the first reference frame number value stored in the unsorted_frame_number_list1 buffer. For example, if the unsorted_frame_number_list1 is not empty, video decoder 30 may insert a first reference frame value from the unsorted_frame_number_list1 buffer into combined reference picture list 98 when that reference frame number value from unsorted_frame_number_list1 buffer does not already exist in combined reference picture list 98. Video decoder 30 may then delete the first reference frame value from the unsorted_frame_number_list1 buffer regardless of whether video decoder 30 inserted the first reference frame value of the unsorted_frame_number_list1 into combined reference picture list 98.

Video decoder 30 may then repeat these steps. For example, video decoder 30 may perform similar functions on the second reference frame value stored in the unsorted_frame_number_list0 buffer, then perform similar functions on the second reference frame value stored in the unsorted_frame_number_list1 buffer, then the third reference frames values in each of the unsorted_frame_number_list0 buffer and the unsorted_frame_number_list1 buffer. Video decoder 30 may repeat these steps until both the unsorted_frame_number_list0 buffer and the unsorted_frame_number_list1 buffer are empty. In this manner, video decoder 30 may construct combined reference picture list 98 in accordance with sub-option three of option one of the default construction techniques.

Sub-option four of option one may be the inverse of sub-option three of option one. For example, in accordance with sub-option four of option one, video decoder 30 may store the reference frame number values of List 1 96 into an unsorted_frame_number_list1 buffer, and store the reference frame number values of List 0 94 into an unsorted_frame_number_list0 buffer.

In sub-option four of option one, if unsorted_frame_number_list1 buffer is not empty, video decoder 30 may insert a first reference frame value from the unsorted_frame_number_list1 buffer into combined reference picture list 98 when that reference frame value from unsorted_frame_number_list1 buffer does not already exist in combined reference picture list 98. Video decoder 30 may then delete the first reference frame value from the unsorted_frame_number_list1 buffer regardless of whether video decoder 30 inserted the first reference frame value of the unsorted_frame_number_list1 into combined reference picture list 98.

Video decoder 30 may perform a similar function with the first reference frame number value stored in the unsorted_frame_number_list0 buffer. For example, if the unsorted_frame_number_list0 is not empty, video decoder 30 may insert a first reference frame value from the unsorted_frame_number_list0 buffer into combined reference picture list 98 when that reference frame number value from unsorted_frame_number_list0 buffer does not already exist in combined reference picture list 98. Video decoder 30 may then delete the first reference frame value from the unsorted_frame_number_list0 buffer regardless of whether video decoder 30 inserted the first reference frame value of the unsorted_frame_number_list0 into combined reference picture list 98.

Video decoder 30 may then repeat these steps. For example, video decoder 30 may perform similar functions on the second reference frame value stored in the unsorted_frame_number_list1 buffer, then perform similar functions on the second reference frame value stored in the unsorted_frame_number_list0 buffer, then the third reference frames values in each of the unsorted_frame_number_list1 buffer and the unsorted_frame_number_list0 buffer. Video decoder 30 may repeat these steps until both the unsorted_frame_number_list1 buffer and the unsorted_frame_number_list0 buffer are empty. In this manner, video decoder 30 may construct combined reference picture list 98 in accordance with sub-option four of option one of the default construction techniques.

The default construction technique, to construct combined reference picture list 98, of option two may be similar to option one. However, in option two, rather than relying on reference frame number values, video decoder 30 may utilize POC values for each of the reference frames of List 0 94 and List 1 96 to construct combined reference picture list 98. For instance, video decoder 30 may construct combined reference picture list 98 by including, and in some cases, alternately including one or more of the reference pictures from both the first reference picture list (List 0 94) and the second reference picture list (List 1 96) based on the POC values of the reference picture of the first reference picture list and the second reference picture list.

For example, there may be at least four examples of sub-options of option two. In two of the four sub-options of option two, video decoder 30 may sort the POC values, rather than frame number values, of the reference frames of List 0 94 and List 1 96. In the other two of the four sub-options, video decoder 30 need not sort the POC values of the reference frames of List 0 94 and List 1 96. In accordance with the techniques, in all four sub-options of option two, video decoder 30 may rely on the POC values for the construction of combined reference picture list 98.

In general, in option two of the default construction techniques, video decoder 30 may place reference POC values from each of List 0 94 and List 1 96 into combined reference picture list 98. However, if both List 0 94 and List 1 96 include the same reference POC values, video decoder 30 may play only one of these duplicate reference POC values into combined reference picture list 98. Again, POC values indicate the order in which the reference frames are displayed.

Each of the four sub-options of option two may be similar to each of the four sub-options of option one, respectively, and video decoder 30 may perform similar functions for each of the four sub-options of option two, but with POC values rather than frame number values. For example, rather than a sorted_frame_number_list0 buffer and a sorted_frame_number_list1 buffer, as in the first and second sub-options of option one, video decoder 30 may utilize a sorted_POC_number_list0 and sorted_POC_number_list1 in a similar manner to construct combined reference picture list 98. Also, rather than an unsorted_frame_number_list0 buffer and an unsorted_frame_number_list1 buffer, as in the third and fourth sub-options of option one, video decoder 30 may utilize a sorted_POC_number_list0 and sorted_POC_number_list1 in a similar manner to construct combined reference picture list 98.

In accordance with the default construction examples above, video decoder 30 may implement at least one of the sub-options of option one or at least one of the sub-options of option two to construct combined reference picture list 98. In any of the example default construction techniques, because video decoder 30 constructed combined reference picture list 98 from List 0 94 and List 1 98, video decoder 30 may, at least implicitly, know whether a reference picture in combined reference picture list 98 came from List 0 94 or List 1 98. For instance, while constructing combined reference picture list 98, video decoder 30 may maintain a mapping that indicates whether video decoder 30 selected a reference picture in combined reference picture list 98 from List 0 94 or List 1 98. There may be other techniques for video decoder 30 to indicate whether it selected a reference picture in combined reference picture list 98 from List 0 94 and List 1 98, and the techniques of this disclosure should not be limited to the example above of maintaining a map.

In some examples, video decoder 30 may reorder combined reference picture list 98. For example, if video decoder 30 implemented option two of the default construction techniques, video decoder 30 may utilize the syntax elements of Table 2 to reorder combined reference picture list 98. For instance, for reordering, when video decoder 30 implements option two of the default construction techniques, video decoder 30 may reorder combined reference picture list 98 based on the signaled, e.g., received, POC values of the reference pictures of List 0 94 and List 1 96. In some of these examples, video decoder 30 may reorder combined reference picture list 98 based only on the signaled POC values without using frame number values of the reference pictures of List 0 94 and List 1 96.

Also, as described above, in the default construction techniques, video decoder 30 may not receive syntax elements for constructing combined reference picture list 98. However, in some examples, video decoder 30 may receive syntax elements for constructing combined reference picture list 98, as well as syntax elements for constructing List 0 94 and List 1 98 from video encoder 20. In these examples, video decoder 30 may construct combined reference picture list 98 from the received syntax elements for constructing combined reference picture list 98. In some of these examples, while video decoder 30 may receive syntax elements for constructing combined reference picture list 98, video decoder 30 may not receive mapping information that indicates whether a reference picture in combined reference picture list 98 is selected from List 0 94 or List 1 98. To address this, in these examples, video decoder 30 may implement default mapping techniques.

The default mapping techniques may assist video decoder 30 in properly decoding the frames. For example, to decode a frame, video decoder 30 may need to know whether a reference picture needed to decode the frame is from List 0 94 or List 1 96 so that video decoder 30 can properly resolve motion vectors used to point to a block in the reference picture. With the mapping, video decoder 30 may be able to resolve the motion vectors, which may allow video decoder 30 to properly decode subsequent frames. Without the mapping, video decoder 30 may not be able to resolve the motion vectors, and in this situation, video decoder 30 may properly decode a current frame, but may not be able to correctly decoded frames subsequent to the current frame. In these cases, errors may propagate in subsequent frames.

In accordance with the default mapping techniques, video decoder 30 may utilize frame number values or POC values, depending on whether video encoder 20 transmitted frame number values or POC values. As one example of the default mapping technique, video decoder 30 may start with a first reference picture in combined reference picture list 98, and may determine whether List 0 94 or List 1 96 includes the first reference picture based on the frame number values or POC values of the reference pictures of combined reference picture list 98, List 0 94, and List 1 96. If only one of List 0 94 or List 1 96 includes the first reference picture in combined reference list 98, then video decoder 30 may map the first reference picture in combined reference list 98 to the picture in one of List 0 94 or List 1 96 that includes the first reference picture. If both of List 0 94 and List 1 96 include the first reference picture in combined reference list 98, then video decoder 30 may map the first reference picture in combined reference picture list 98 to the picture in one of List 0 94 or List 1 96, but not to both.

Video decoder 30 may then repeat these steps for a second reference picture in combined reference picture list 98. In general, if a picture in combined reference picture list 98 is found in both List 0 94 and List 1 96, such that there is an overlap (i.e., redundancy), in accordance with the default mapping technique, this duplicate picture will always be mapped to the picture in List 0 94 or, alternatively, always mapped to the picture in List 1 96, but not to both L0 and L1 (or to L0 or L1 on an arbitrary basis). In these examples, video encoder 20 may have similarly mapped the combined reference picture list that it transmitted; however, aspects of this disclosure are not so limited.

The following is pseudo-code that provides an example implementing the default mapping techniques. In the pseudo-code, LC is combined reference picture list 98, L0 is the List 0 94, and L1 is List 1 96. The following pseudo-code is applicable where the reference pictures of combined reference picture list 98, List 0 94, and List 1 94 are referenced with frame number values.

Assume that the combined list LC, L0 and L1 are explicitly signaled with frame_num values. For example, the frames number values are RefPicList0FN[i] (i ranging from 0 to num_ref_idx_10_active_minus1), RefPicList1FN[i] (i ranging from 0 to num_ref_idx_11 active_minus1) and RefPicListcFN[i] (i ranging from 0 to num_ref_idx_lc_active_minus1).

Assume MapCtoList0or1[$i$] is a mapping from a picture in the combined list LC either to L0 or L1.

```
for (i=0;i< num_ref_idx_lc_active_minus1; i++) {
    for (j=0; j< num_ref_idx_l0_active_minus1; j++)
        if (RefPicListcFN[i]== RefPicList0FN[j]) {
            MapCToList0or1[i]= −0;
            break;
        }
    for (j=0; j< num_ref_idx_l1_active_minus1; j++)
        if (RefPicListcFN[i]== RefPicList1FN[j]) {
            MapCToList0or1[i]= 1;
            break;
        }
}
```

Alternatively, such a mapping can be conducted first to L1 and then L0.

In the above example, video decoder 30 started with determining whether a picture of combined reference picture list is in List 0 94, and then whether the picture of combined reference picture list is in List 1 96. In alternate examples, video decoder 30 may start with List 1 96 and then List 0 94 to map each of the pictures of combined reference picture list 98 to each of the pictures of List 0 94 or List 1 96.

Moreover, in the above example, video decoder 30 utilized frame number values for the mapping. If video encoder 20 transmitted POC values for the reference pictures of combined reference picture list 98, List 0 94, and List 1 96, video decoder 30 may utilize these POC values for the mapping of each of the pictures of combined reference picture list 98 to each of the pictures of List 0 94 or List 1 96. The following is the pseudo-code for such mapping based on POC values.

Assume that the combined list LC, L0 and L1 are explicitly signaled with POC values. For example, L0, L1 and LC are signaled by RefPicList0POC[i] (i ranging from 0 to num_ref_idx_10_active_minus1), RefPicList1POC[i] (i ranging from 0 to num_ref_idx_11_active_minus1) and RefPicListcPOC[i] (i ranging from 0 to num_ref_idx_lc_active_minus1).

Assume MapCtoList0or1[$i$] is a mapping from a picture in the combined list either to List 0 or List 1.

```
for (i=0;i< num_ref_idx_lc_active_minus1; i++) {
    for (j=0; j< num_ref_idx_l0_active_minus1; j++)
        if (RefPicListcPOC[i]== RefPicList0POC[j]) {
            MapCToList0or1[i]= −0;
            break;
        }
    for (j=0; j< num_ref_idx_l1_active_minus1; j++)
        if (RefPicListcPOC[i]== RefPicList1POC[j]) {
            MapCToList0or1[i]= 1;
            break;
        }
}
```

Similar to the default mapping example that utilizes frame number values, in the above example, video decoder 30 started with determining whether a picture of combined reference picture list is in List 0 94, and then whether the picture of combined reference picture list is in List 1 96. In alternate examples, video decoder 30 may start with List 1 96 and then List 0 94 to map each of the pictures of combined reference picture list 98 to each of the pictures of List 0 94 or List 1 96.

Figure 5:
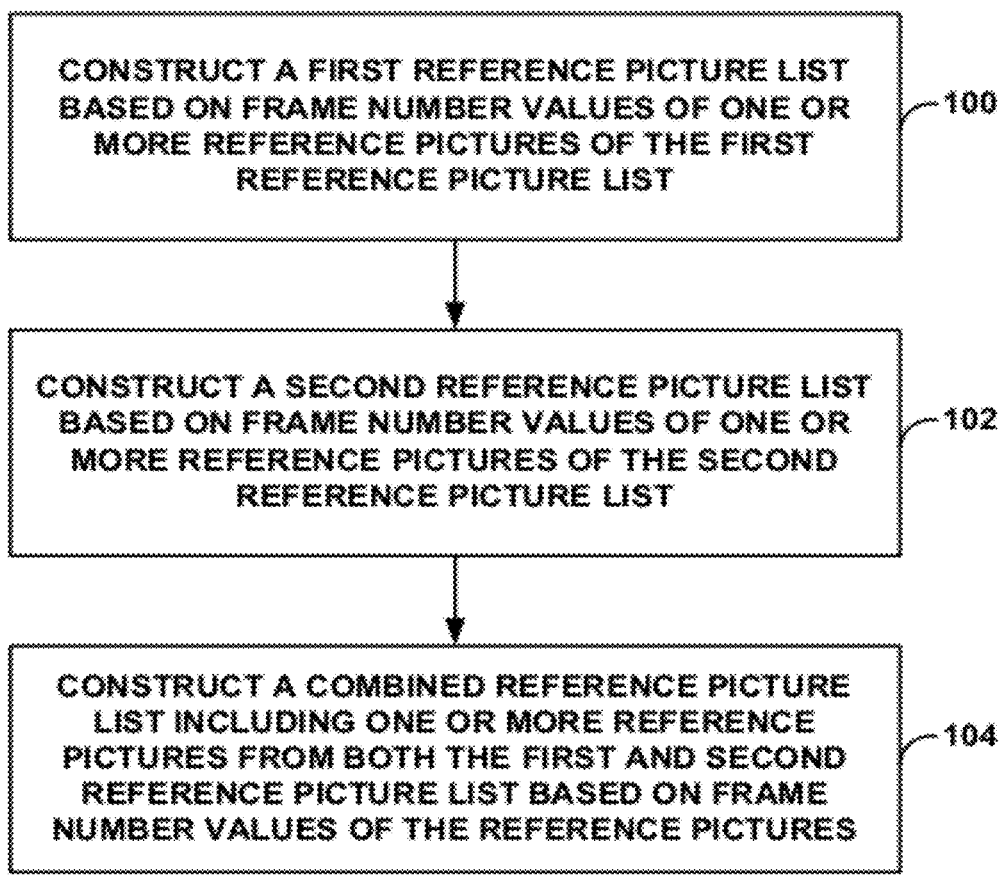
FIG. 5 is a flowchart illustrating an example of a default construction technique.

FIG. 5 is a flowchart illustrating an example of the default construction technique. For purposes of illustration and ease of description, reference is made to FIG. 4. The example of FIG. 5 may be applicable where video decoder 30 implements option one of the default construction techniques described above.

Video decoder 30 may construct a first reference picture list based on frame number values of one or more reference pictures, stored in reference picture memory 92, indicated to be in the first reference picture list (100). For example, video decoder 30 may receive syntax elements that indicate which reference pictures are identified in List 0 94. For example, these syntax elements may be frame number values for the reference pictures of List 0 94. From these frame number values, video decoder 30 may construct List 0 94.

Video decoder 30 may construct a second reference picture list based on frame number values of one or more reference pictures, stored in reference picture memory 92, indicated to be in the second reference picture list (102). For example, video decoder 30 may receive syntax elements that indicate which reference pictures are identified in List 1 96. For example, these syntax elements may be frame number values for the reference pictures of List 1 96. From these frame number values, video decoder 30 may construct List 1 96.

Video decoder 30 may construct a combined reference picture list including one or more reference pictures from both the first and second reference picture list based on the frame number values of the reference pictures (104). For example, video decoder 30 may implement any one of sub-options one through four of option one, as described above, to construct combined reference picture list 98 with the frame number values of the reference frames in List 0 94 and List 1 96. In some examples, video decoder 30 may construct the combined reference picture list 98 without decoding instruction from video encode 20 that instruct a manner in which to construct the combined reference picture list 98.

For example, in accordance with any of the sub-options of option one of the default construction techniques, video decoder 30 may place reference frame number values from each of List 0 94 and List 1 96 into combined reference picture list 98. However, if both List 0 94 and List 1 96 include the same reference frame number values, video decoder 30 may place only one of these duplicate reference frame number values into combined reference picture list 98.

In some examples, video decoder 30 may sort the reference pictures of both List 0 94 and List 1 96 in ascending (e.g., smallest frame number value to largest frame number value) or descending order (e.g., largest frame number value to smallest frame number value), based on the reference frame number values, to place reference frame number values into combined reference picture list 98. In some other examples, video decoder 30 may not sort the reference frame number values to place reference frame number values into combined reference picture list 98.

In either of these examples, in some cases, video decoder 30 may track, e.g., map, whether a reference picture placed in combined reference picture list 98 came from List 0 94 or List 1 96, although aspects of this disclosure are not so limiting. In this way, video decoder 30 may alternate between inserting one of the frame number values of the one of the reference pictures from List 0 94 and one of the frame number values of the one of the reference pictures from List 1 96 if a frame number value for a reference picture from either List 0 94 or List 1 96 does not already exist in combined reference picture list 98.

Figure 6:
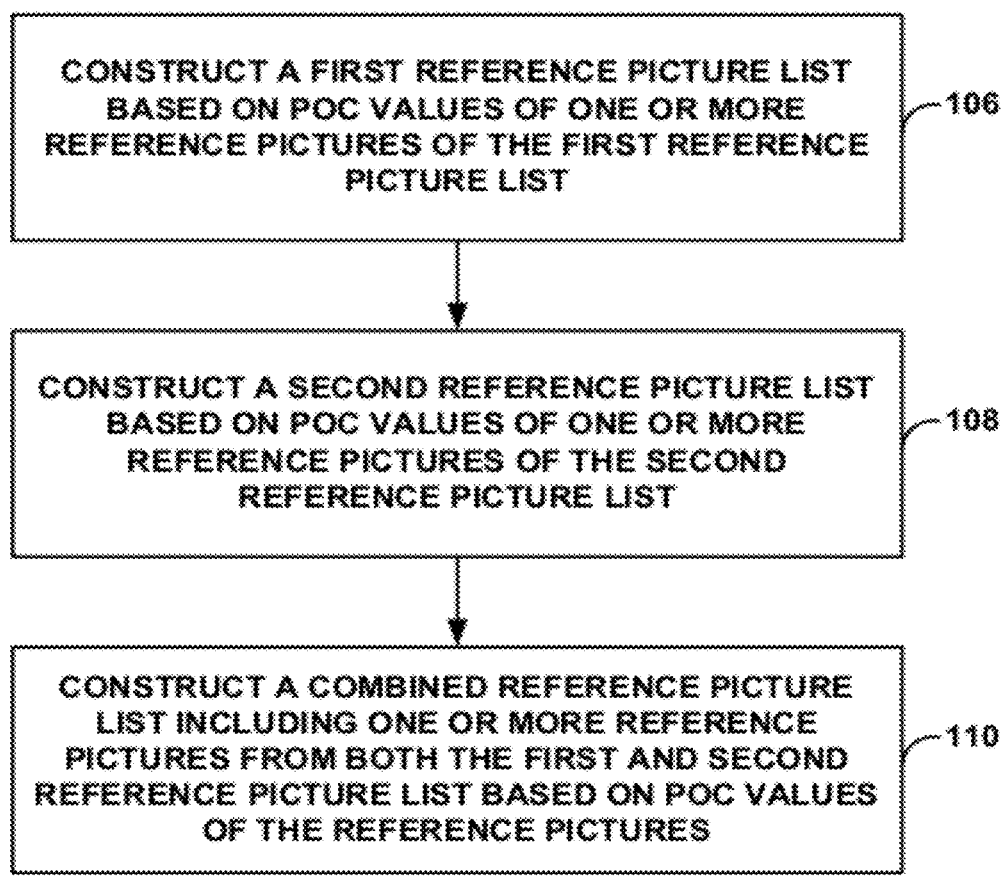
FIG. 6 is a flowchart illustrating another example of a default construction technique.

FIG. 6 is a flowchart illustrating another example of the default construction technique. For purposes of illustration and ease of description, reference is made to FIG. 4. The example of FIG. 6 may be applicable where video decoder 30 implements option two of the default construction techniques described above.

Video decoder 30 may construct a first reference picture list based on picture order count (POC) values of one or more reference pictures, stored in reference picture memory 92, indicated to be in the first reference picture list (106). For example, video decoder 30 may receive syntax elements that indicate which reference pictures are identified in List 0 94. For example, these syntax elements may be POC values for the reference pictures of List 0 94. From these POC values, video decoder 30 may construct List 0 94.

Video decoder 30 may construct a second reference picture list based on POC values of one or more reference pictures, stored in reference picture memory 92, indicated to be in the second reference picture list (108). For example, video decoder 30 may receive syntax elements that indicate which reference pictures are identified in List 1 96. For example, these syntax elements may be POC values for the reference pictures of List 1 96. From these POC values, video decoder 30 may construct List 1 96.

Video decoder 30 may construct a combined reference picture list including one or more reference pictures from both the first and second reference picture list based on the POC values of the reference pictures (110). For example, video decoder 30 may implement any one of sub-options one through four of option two, as described above, to construct combined reference picture list 98 with the POC values of the reference frames in List 0 94 and List 1 96. Similar to the example of FIG. 6, in FIG. 7, in some examples, video decoder 30 may construct the combined reference picture list 98 without decoding instruction from video encode 20 that instruct a manner in which to construct the combined reference picture list 98.

For example, in accordance with any of the sub-options of option two of the default construction techniques, video decoder 30 may place reference POC values from each of List 0 94 and List 1 96 into combined reference picture list 98. However, if both List 0 94 and List 1 96 include the same reference POC values, video decoder 30 may place only one of these duplicate reference POC values into combined reference picture list 98. In some examples, video decoder 30 may sort the reference pictures of both List 0 94 and List 1 96 in ascending (e.g., smallest POC value to largest POC value) or descending order (e.g., largest POC value to smallest POC value), based on the reference POC values, to place reference POC values into combined reference picture list 98. In some other examples, video decoder 30 may not sort the reference POC values to place reference POC values into combined reference picture list 98.

In either of these examples, in some cases, video decoder 30 may track, e.g., map, whether a reference picture placed in combined reference picture list 98 came from List 0 94 or List 1 96, although aspects of this disclosure are not so limiting. In this way, video decoder 30 may alternate between inserting one of the POC values of the one of the reference pictures from List 0 94 and one of the POC values of the one of the reference pictures from List 1 96 if a POC value for a reference picture from either List 0 94 or List 1 96 does not already exist in combined reference picture list 98.

Figure 7:
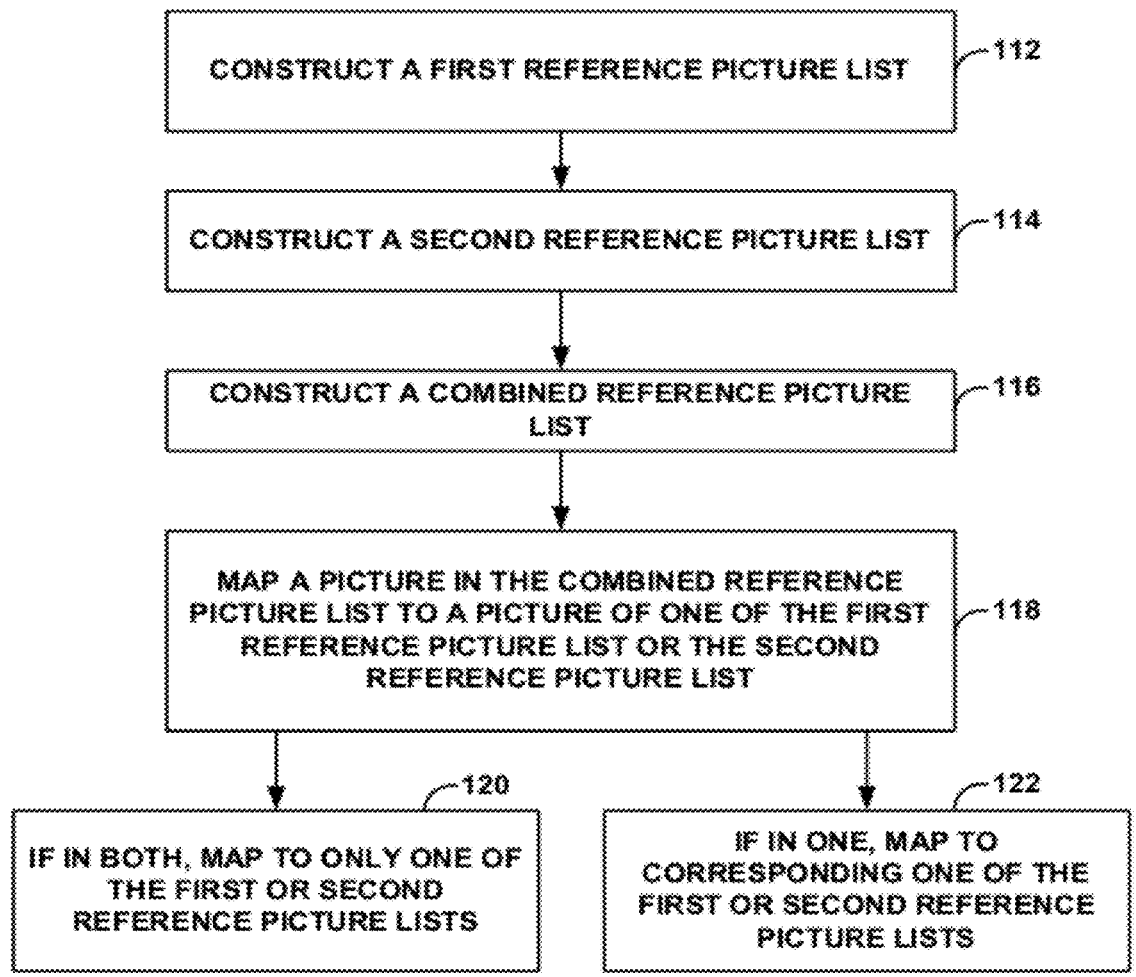
FIG. 7 is a flowchart illustrating an example of a default mapping technique.

FIG. 7 is a flowchart illustrating an example of the default mapping technique. For purposes of illustration and ease of description, reference is made to FIG. 4. The example of FIG. 7 may be applicable where video decoder 30 receives syntax elements for the construction of combined reference picture list 98, List 0 94, and List 1 96, but may not receive mapping information.

Video decoder 30 may construct a first reference picture list (112). For instance, in the example of FIG. 7, video decoder 30 may construct List 0 94 in a manner similar to those of FIGS. 5 and 6. For example, video decoder 30 may construct List 0 94 based on reference frame number values or POC values.

Video decoder 30 may construct a second reference picture list (114). For instance, in the example of FIG. 7, video decoder 30 may construct List 1 96 in a manner similar to those of FIGS. 5 and 6. For example, video decoder 30 may construct List 1 96 based on reference frame number values or POC values.

Video decoder 30 may construct a combined reference picture list (116). In this example, video decoder 30 may receive syntax elements for the reference pictures in combined reference picture list 98. Video decoder 30 may construct combined reference picture list 98 from these received syntax elements for the reference pictures, rather than from List 0 94 and List 1 98.

Video decoder 30 may map a picture in the combined reference picture list to a picture of one of the first reference picture list or the second reference picture list (118). For example, if the picture in combined reference picture list 98 is a picture in both List 0 94 and List 1 96, video decoder 30 may map this picture in combined reference picture list 98 to either the corresponding picture in List 0 94 or List 1 96 based on the frame number values or POC values of the reference pictures in combined reference picture list 98, List 0 94, and List 1 96 (120). Video decoder 30 may repeat this step for each reference picture in combined reference picture list 98 that corresponds to reference pictures in both of List 0 94 and List 1 96, and may always map such reference pictures that are present in both List 0 94 and List 1 96 to List 0 94, in some examples, or List 1 96 in alternate examples, but not to both.

If the picture in combined reference picture list 98 is a picture in only one of List 0 94 and List 1 96, video decoder 30 may map this picture in combined reference picture list 98 to the corresponding picture in one of List 0 or List 1 that corresponds to the picture in combined reference picture list 98 (122). Video decoder 30 may repeat this step for each reference picture that is not present in both of List 0 94 and List 1 96.

Figure 8:
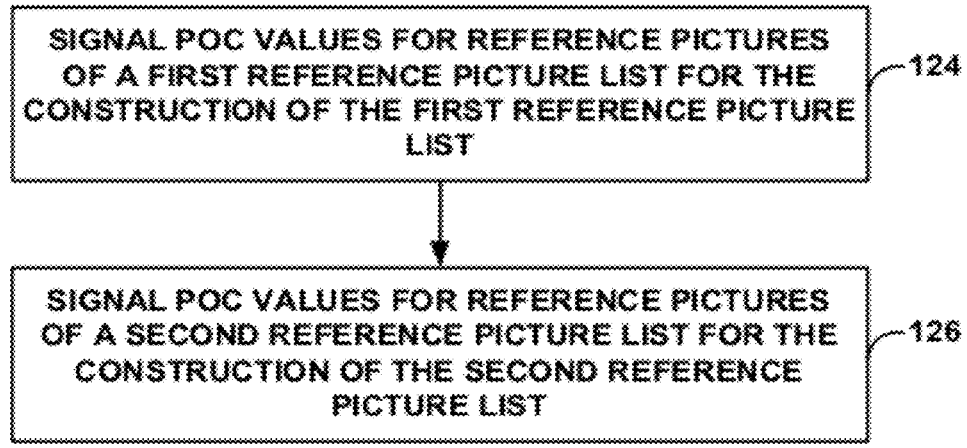
FIG. 8 is a flowchart illustrating an example operation of a video encoder.

FIG. 8 is a flowchart illustrating an example operation of video encoder 20. For purposes of illustration and ease of description, reference is made to FIG. 3. The example of FIG. 8 may be applicable to examples where video decoder 30 implements any of the sub-options of option two of the default construction techniques.

Video encoder 20 may signal POC values for reference pictures of a first reference picture list for the construction of the first reference picture list (124). For example, these POC values may be for the construction of List 0 94 by video decoder 30. Video encoder 20 may also signal POC values for reference pictures of a second reference picture list for the construction of the second reference picture list (126). For example, these POC values may be for the construction of List 1 96 by video decoder 30.

Figure 9:
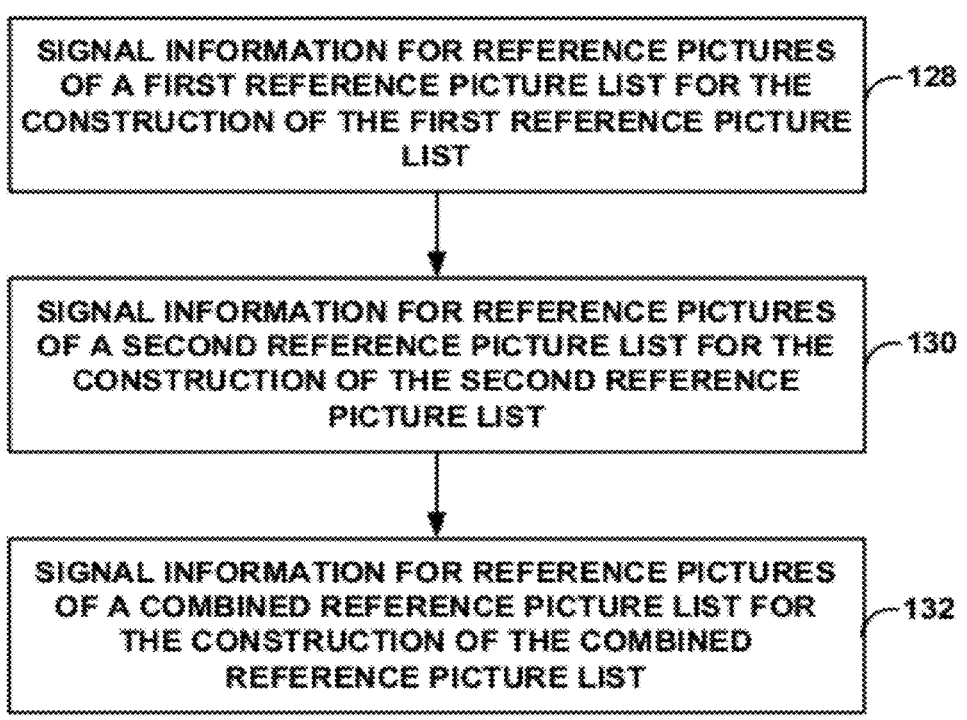
FIG. 9 is a flowchart illustrating another example operation of a video encoder.

FIG. 9 is a flowchart illustrating another example operation of video encoder 20. For purposes of illustration and ease of description, reference is made to FIG. 3. The example of FIG. 9 may be applicable to examples where video decoder 30 implements the default mapping techniques.

Video encoder 20 may signal information, e.g., syntax elements, for reference pictures of a first reference picture list, e.g., List 0 66, for the construction of the first reference picture list, e.g., List 0 94 (128). Video encoder 20 may also signal information, e.g., syntax elements, for reference pictures of a second reference picture list, e.g., List 1 68, for the construction of the second reference picture list, e.g., List 1 96 (130). In the example of FIG. 9, video encoder 20 may also signal information, e.g., syntax elements, for reference pictures of a combined reference picture list, e.g., combined reference picture list 98, for the construction of the combined reference picture list 98 by video decoder 30. In the example of FIG. 9, video encoder 20 may not transmit information that indicates the mapping of the reference pictures of the combined reference picture list to the reference pictures of List 0 66 or List 1 68.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding video data, the method comprising:
   receiving picture order count (POC) values of one or more reference pictures indicated to be in a first reference picture list in information signaled by an encoder;
   receiving POC values of one or more reference pictures indicated to be in a second reference picture list in information signaled by the encoder;
   constructing the first reference picture list based on the POC values of the one or more reference pictures indicated to be in the first reference picture list;
   constructing the second reference picture list based on the POC values of the one or more reference pictures indicated to be in the second reference picture list; and
   constructing a combined reference picture list, without decoding instructions from the encoder that instruct a manner in which to construct the combined reference picture list, to include one or more of the reference pictures of the first reference picture list and one or more of the reference pictures of the second reference picture list based on the POC values of the reference pictures of the first reference picture list and the POC values of the reference pictures of the second reference picture list.

2. The method of claim 1, wherein constructing a combined reference picture list comprises:
   alternately inserting one of the reference pictures from the first reference picture list and one of the reference pictures from the second reference picture list in the combined reference picture list if a POC value for a reference picture from either the first or second reference picture list does not already exist in the combined reference picture list.

3. The method of claim 1, wherein constructing the combined reference picture list comprises:
   sorting the POC values of the reference pictures in the first reference picture list;
   sorting the POC values of the reference pictures in the second reference picture list; and
   alternately inserting one of the reference pictures from the first reference picture list and one of the reference pictures from the second reference picture list in the combined reference picture list if a POC value for a reference picture from either the first or second reference picture list does not already exist in the combined reference picture list.

4. The method of claim 3, wherein sorting the POC values of reference pictures in the first reference picture list comprises sorting in descending order the POC values of reference pictures in the first reference picture list, and sorting the POC values of reference pictures in the second reference picture list comprises sorting in ascending order the POC values of reference pictures in the second reference picture list.

5. The method of claim 3, wherein sorting the POC values of reference pictures in the first reference picture list comprises sorting in ascending order the POC values of reference pictures in the first reference picture list, and sorting the POC values of reference pictures in the second reference picture list comprises sorting in descending order the POC values of reference pictures in the second reference picture list.

6. The method of claim 1, further comprising reordering the reference pictures in the combined reference picture list based on the POC values of the reference pictures of the first and second reference picture lists.

7. The method of claim 1, further comprising reordering the reference pictures in the combined reference picture list based on the POC values of the reference pictures of the first and second reference picture lists, and without using frame number values of the reference pictures of the first and second reference picture lists.

8. A video coding device comprising:
a memory configured to store reference pictures; and
a video coder configured to:
receive picture order count (POC) values of one or more stored reference pictures indicated to be in a first reference picture list in information signaled by an encoder;
receive POC values of one or more stored reference pictures indicated to be in a second reference picture list in information signaled by the encoder;
construct the first reference picture list based on the POC values of the one or more of the stored reference pictures indicated to be in the first reference picture list;
construct the second reference picture list based on the POC values of the one or more of the stored reference pictures indicated to be in the second reference picture list; and
construct a combined reference picture list, without decoding instructions from the encoder that instruct a manner in which to construct the combined reference picture list, to include one or more of the reference pictures of the first reference picture list and one or more reference pictures of the second reference picture list based on the POC values of the reference pictures of the first reference picture list and the POC values of the reference pictures of the second reference picture list.

9. The video coding device of claim 8, wherein the video coder comprises a decoder.

10. The video coding device of claim 8, wherein the video coder is configured to alternately insert of one of the reference pictures from the first reference picture list and one of the reference pictures from the second reference picture list in the combined reference picture list if a POC value for a reference picture from either the first or second reference picture list does not already exist in the combined reference picture list to construct the combined reference picture list.

11. The video coding device of claim 8, wherein the video coder is further configured to:
sort the POC values of the reference pictures in the first reference picture list;
sort the POC values of the reference pictures in the second reference picture list; and
alternately insert one of the reference pictures from the first reference picture list and one of the reference pictures from the second reference picture list in the combined reference picture list if a POC value for a reference picture from either the first or second reference picture list does not already exist in the combined reference picture list.

12. The video coding device of claim 11, wherein the video coder is configured to sort in descending order the POC values of reference pictures in the first reference picture list, and sort in ascending order the POC values of reference pictures in the second reference picture list.

13. The video coding device of claim 11, wherein the video coder is configured to sort in ascending order the POC values of reference pictures in the first reference picture list, and sort in descending order the POC values of reference pictures in the second reference picture list.

14. The video coding device of claim 8, wherein the video coder is further configured to reorder the reference pictures in the combined reference picture list based on the POC values of the reference pictures of the first and second reference picture lists.

15. The video coding device of claim 8, wherein the video coder is further configured to reorder the reference pictures in the combined reference picture list based on the POC values of the reference pictures of the first and second reference picture lists, and without using frame number values of the reference pictures of the first and second reference picture lists.

16. A non-transitory computer-readable storage medium comprising instructions that, when executed, cause a video decoder to:
receive picture order count (POC) values of one or more reference pictures indicated to be in a first reference picture list in information signaled by an encoder;
receive POC values of one or more reference pictures indicated to be in a second reference picture list in information signaled by the encoder;
construct the first reference picture list based on the POC values of the one or more reference pictures indicated to be in the first reference picture list;
construct the second reference picture list based on the POC values of the one or more reference pictures indicated to be in the second reference picture list; and
construct a combined reference picture list, without decoding instructions from the encoder that instruct a manner in which to construct the combined reference picture list, to include one or more of the reference pictures of the first reference picture list and one or more reference pictures of the second reference picture list based on the POC values of the reference pictures of the first reference picture list and the POC values of the reference pictures of the second reference picture list.

17. The non-transitory computer-readable storage medium of claim 16, wherein the instructions to construct a combined reference picture list comprise instructions to:
alternately insert one of the reference pictures from the first reference picture list and one of the reference pictures from the second reference picture list in the combined reference picture list if a POC value for a reference picture from either the first or second reference picture list does not already exist in the combined reference picture list.

18. The non-transitory computer-readable storage medium of claim 16, wherein the instructions to construct the combined reference picture list comprise instructions to:
sort the POC values of the reference pictures in the first reference picture list;
sort the POC values of the reference pictures in the second reference picture list; and alternately insert one of the reference pictures from the first reference picture list and one of the reference pictures from the second reference picture list in the combined reference picture list if a POC value for a reference picture from either the first or second reference picture list does not already exist in the combined reference picture list.

19. The non-transitory computer-readable storage medium of claim 18, wherein the instructions to sort the POC values of reference pictures in the first reference picture list comprise instructions to sort in descending order the POC values of reference pictures in the first reference picture list, and the instructions to sort the POC values of reference pictures in the second reference picture list comprises instructions to sort in ascending order the POC values of reference pictures in the second reference picture list.

20. The non-transitory computer-readable storage medium of claim 18, wherein the instructions to sort the POC values of reference pictures in the first reference picture list comprise instructions to sort in ascending order the POC values of reference pictures in the first reference picture list, and the instructions to sort the POC values of reference pictures in the second reference picture list comprise instructions to sort in descending order the POC values of reference pictures in the second reference picture list.

21. The non-transitory computer-readable storage medium of claim 16, further comprising instructions to reorder the reference pictures in the combined reference picture list based on the POC values of the reference pictures of the first and second reference picture lists.

22. The non-transitory computer-readable storage medium of claim 16, further comprising instructions to reorder the reference pictures in the combined reference picture list based on the POC values of the reference pictures of the first and second reference picture lists, and without using frame number values of the reference pictures of the first and second reference picture lists.

23. A video coding device comprising:
means for receiving picture order count (POC) values of one or more reference pictures indicated to be in a first reference picture list in information signaled by an encoder;
means for receiving POC values of one or more reference pictures indicated to be in a second reference picture list in information signaled by the encoder;
means for constructing the first reference picture list based on the POC values of the one or more reference pictures indicated to be in the first reference picture list;
means for constructing the second reference picture list based on the POC values of the one or more reference pictures indicated to be in the second reference picture list; and
means for constructing a combined reference picture list, without decoding instructions from the encoder that instruct a manner in which to construct the combined reference picture list, to include one or more of the reference pictures of the first reference picture list and one or more of the reference pictures of the second reference picture list based on the POC values of the reference pictures of the first reference picture list and the POC values of the reference pictures of the second reference picture list.

24. The video coding device of claim 23, further comprising a decoder, wherein the decoder comprises the means for constructing the first reference picture list, the means for constructing the second reference picture, and the means for constructing the combined reference picture list.

25. The video coding device of claim 23, wherein the means for constructing a combined reference picture list comprises:
means for alternately inserting one of the reference pictures from the first reference picture list and one of the reference pictures from the second reference picture list in the combined reference picture list if a POC value for a reference picture from either the first or second reference picture list does not already exist in the combined reference picture list.

26. The video coding device of claim 23, wherein the means for constructing a combined reference picture list comprises:
means for sorting the POC values of the reference pictures in the first reference picture list;
means for sorting the POC values of the reference pictures in the second reference picture list; and
means for alternately inserting one of the reference pictures from the first reference picture list and one of the reference pictures from the second reference picture list in the combined reference picture list if a POC value for a reference picture from either the first or second reference picture list does not already exist in the combined reference picture list.

27. The video coding device of claim 26, wherein the means for sorting the POC values of reference pictures in the first reference picture list comprises means for sorting in descending order the POC values of reference pictures in the first reference picture list, and the means for sorting the POC values of reference pictures in the second reference picture list comprises means for sorting in ascending order the POC values of reference pictures in the second reference picture list.

28. The video coding device of claim 26, wherein the means for sorting the POC values of reference pictures in the first reference picture list comprises means for sorting in ascending order the POC values of reference pictures in the first reference picture list, and the means for sorting the POC values of reference pictures in the second reference picture list comprises means for sorting in descending order the POC values of reference pictures in the second reference picture list.

29. The video coding device of claim 23, further comprising means for reordering the reference pictures in the combined reference picture list based on the POC values of the reference pictures of the first and second reference picture lists.

30. The video coding device of claim 23, further comprising means for reordering the reference pictures in the combined reference picture list based on the POC values of the reference pictures of the first and second reference picture lists, and without using frame number values of the reference pictures of the first and second reference picture lists.

* * * * *